United States Patent
Johansson

(10) Patent No.: US 10,901,591 B2
(45) Date of Patent: Jan. 26, 2021

(54) GRAPHICAL USER INTERFACE CUSTOMIZATION FOR AUTOMATING COMPLEX OPERATIONS

(71) Applicant: Amazon Technologies, Inc., Seattle, WA (US)

(72) Inventor: Jesper Mikael Johansson, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 312 days.

(21) Appl. No.: 14/970,368

(22) Filed: Dec. 15, 2015

(65) Prior Publication Data
US 2017/0168691 A1   Jun. 15, 2017

(51) Int. Cl.
| | | |
|---|---|---|
| *G06Q 30/06* | (2012.01) | |
| *G06Q 30/00* | (2012.01) | |
| *G06Q 30/02* | (2012.01) | |
| *G06F 3/0484* | (2013.01) | |
| *G06F 9/445* | (2018.01) | |

(Continued)

(52) U.S. Cl.
CPC ...... *G06F 3/04847* (2013.01); *G06F 3/04817* (2013.01); *G06F 9/44505* (2013.01); *G06F 9/451* (2018.02); *G06Q 30/0251* (2013.01); *G06Q 30/0255* (2013.01); *G06Q 30/0259* (2013.01); *G06Q 30/0269* (2013.01); *G06Q 30/0621* (2013.01); *G06Q 30/0631* (2013.01); *G06Q 30/0633* (2013.01); *G06Q 30/0641* (2013.01)

(58) Field of Classification Search
CPC ............ G06Q 30/02; G06Q 30/0255; G06Q 30/0601; G06Q 30/0641
See application file for complete search history.

(56) References Cited

U.S. PATENT DOCUMENTS

| | | | |
|---|---|---|---|
| 2010/0076857 A1* | 3/2010 | Deo ................ | G06Q 30/00 705/26.1 |
| 2010/0185532 A1* | 7/2010 | Allocca ............ | G06Q 20/203 705/26.1 |

(Continued)

OTHER PUBLICATIONS

Hoseini-Tabatabaei et al., "A Survey on Smartphone-Based Systems for Opportunistic User Context Recognition," ACM Computing Surveys, Jul. 3, 2013, 45(3)27:1-51.

(Continued)

*Primary Examiner* — Jordany Nunez
(74) *Attorney, Agent, or Firm* — Davis Wright Tremaine LLP

(57) ABSTRACT

A retail vendor application installed on a user device receives configuration parameters for a user interface button that can be used by a user of the device to purchase an item available for consumption. The application determines, based at least in part on the configuration parameters, an activity trigger that, if detected, causes the application to present the button to the user. The application monitors sensors and applications on the user device to obtain data that can be used to detect the activity trigger. In response to detection of the activity trigger, the application updates an interface of the user device to present the button. If the user selects the button, the application generates a purchase request for the item that is sent to a retail vendor service for processing.

20 Claims, 14 Drawing Sheets

(51) Int. Cl.
*G06F 9/451* (2018.01)
*G06F 3/0481* (2013.01)

(56) References Cited

U.S. PATENT DOCUMENTS

| | | | | |
|---|---|---|---|---|
| 2012/0041767 | A1* | 2/2012 | Hoffman | A63B 24/0059 705/1.1 |
| 2012/0150677 | A1* | 6/2012 | Shuster | G06Q 30/0601 705/26.1 |
| 2012/0197705 | A1* | 8/2012 | Mesaros | G06Q 30/0222 705/14.23 |
| 2013/0046651 | A1* | 2/2013 | Edson | G06Q 30/0255 705/26.4 |
| 2014/0258021 | A1* | 9/2014 | Akin | G06Q 30/0631 705/26.7 |
| 2017/0262697 | A1* | 9/2017 | Kaps | G06K 9/00342 |
| 2017/0278419 | A1* | 9/2017 | Wells | G06F 19/3481 |
| 2017/0300643 | A1* | 10/2017 | Bezark | G06F 19/3481 |
| 2018/0071583 | A1* | 3/2018 | Paiz | A63B 24/0062 |

OTHER PUBLICATIONS

International Search Report and Written Opinion dated Apr. 20, 2017, International Patent Application No. PCT/US2016/065208, filed Dec. 6, 2016.

Korpipaa et al., "Managing Context Information in Mobile Devices," Pervasive Computing, Jul. 1, 2003, retrieved on Sep. 11, 2013, from http://ieeexplore.ieee.org/document/1228526, pp. 42-51.

Lee et al., "An Adaptive User Interface Based on Spatiotemporal Structure Learning," IEEE Communications Magazine, Jun. 1, 2011, 49(6):118-124.

Smailovic et al., "Implicit Social Networking for Mobile Users: Data Monetization for Telcos through Context-Aware Services," Proceedings of the 12th International Conference on Telecommunications, IEEE, Jun. 26, 2013, pp. 163-170.

Chinese Office Action for Patent Application No. 2016800726862 dated Sep. 2, 2020, 15 pages.

\* cited by examiner

GRAPHICAL USER INTERFACE CUSTOMIZATION FOR AUTOMATING COMPLEX OPERATIONS

BACKGROUND

Users of computing devices may often desire to configure their computing devices to serve their particular needs. For instance, a user of the computing device may want to configure its computing device to execute one or more applications installed on the user device in response to particular user behaviors or activities. However, configuring the user device to execute the one or more applications in response to the particular user behaviors or activities can be difficult. For instance, even with modern technology facilitating the use of graphical user interfaces to select and execute various applications, a user may find it cumbersome to execute an application on the device and to perform one or more operations through interaction with the application. Further, users may find it to be inefficient to repeat the same process for frequently accessed applications after the particular user behaviors are demonstrated or activities are performed.

BRIEF DESCRIPTION OF THE DRAWINGS

Various techniques will be described with reference to the drawings, in which.

DETAILED DESCRIPTION

Figure 1:
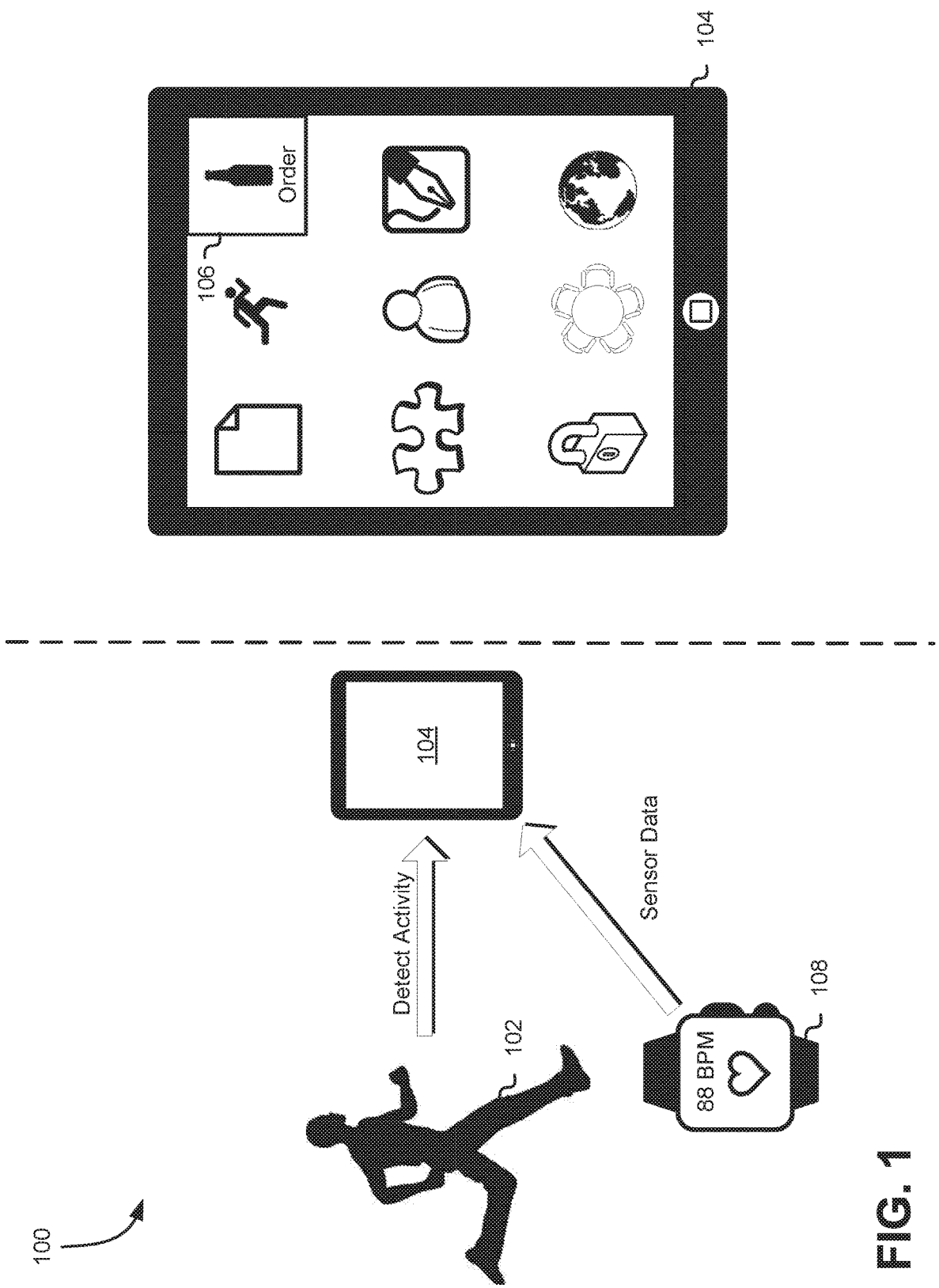
FIG. 1 shows an illustrative example of an environment in which various embodiments can be implemented.

This disclosure relates to the configuration and use of user interface buttons displayed on a graphical user interface (GUI) of a device to enable users to transmit specially-configured communications, such as communications that trigger another computer system to perform one or more actions, such as by initiating a workflow in a distributed computer system. In an example, a user of a device executes an application installed on the device to configure a user interface button that can be used to cause the device to perform operations on behalf of the user. The application may enable the user to identify how the user interface button is to be presented to the user. For instance, the user may specify, through the application, that the user interface button is to be displayed on the GUI of the device in response to a particular activity trigger (e.g., end of a run, end of a hike, entering into a particular neighborhood, etc.). The user may further specify, through the application, a set of actions that may be performed in response to selection of the user interface button presented to the user. In some instances, the user may configure the presentation of the user interface button on the GUI or any other notifications that are to be provided in response to detection of the activity trigger. In response to the user's configuration of the user interface button, the application may configure a monitoring component to monitor for any signals data that may be used to determine whether the user is engaged in the specified activity and to identify the activity trigger.

In an example, if the application detects the activity trigger, the application determines the configuration of the user interface to be presented to the user based on the information provided by the user through the initial configuration of the button. The application may determine whether the user has specified that a particular user interface button be presented to the user in response to the activity trigger that, if actuated, may trigger a particular service or other actions that may be performed through the user device. The application may provide various activity data to a service, which may use this activity data to provide input for configuration of the user interface button. In response, the service may provide the input for configuration of the user interface button to the application, which may use the input and the activity data to generate a user interface button that is based on the provided input and the activity data. In some examples, the application can cache the provided input within the user device such that, in response to the activity trigger, the application can use the input from the cache and use this input for generation of the user interface button.

A user of the user device can select the user interface button to trigger a particular service or other actions that may be performed through the user device. In response to selection of the user interface button, the application may generate a request, on behalf of the user, to perform one or more actions as specified by the user or through the inputs provided by the service. This request may be transmitted, by the application, to the service, which may authenticate the user and ensure that the request can be processed. Accordingly, the service may process the request to perform one or more operations on behalf of the user. The service may provide a confirmation of receipt of request. The application may update the GUI of the user device to prominently display a confirmation of the request to enable the user to verify that the request has been received through selection of the user interface button.

In this manner, a user of a user device may be presented with a user interface button in response to performance of a particular activity, enabling the user to select the user interface button to submit a request for performance of actions on behalf of the user. The techniques described and suggested herein facilitate additional technical advantages. For example, because the user interface button can be configured to be presented to the user in response to detection of a particular activity, the risk of the user accidentally utilizing the user interface button at an inopportune time is minimized. Thus, the user interface button may be presented to the user in a contextual manner, allowing the user to be presented with the user interface button when it may be most desirable for the user to request performance of the desired actions.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a user 102 may utilize a user device 104 for various purposes. For instance, the user device 104 may include a tablet computer, a laptop computer, smartphone, smartwatch, fitness tracking device, heart monitoring device, and the like. The user device 104 may have installed a variety of different applications that may be represented on a GUI of the user device 104 through one or more iconic representations of the applications. The user device 104 may include a user interface button application installed on the user device 104, which may be used by the user 102 to configure one or more user interface buttons 106 that may be presented to the user 102 through the GUI. Through the application, the user 102 may identify one or more activity triggers that may be used to determine how the application is to present the one or more user interface buttons 106 to the user through the GUI, as well as the one or more triggers that may be used by the application to determine if the one or more user interface buttons 106 are to be presented to the user 102.

Through the application, the user 102 may further define the one or more user interface buttons 106 that are to be presented to the user 102 in response to the activity triggers. For instance, the user 102 may define a user interface button 106 that, if selected, may cause the user device 104 to submit an order for one or more items available for consumption. The user 102, through the application, may specify a specific item that is to be associated with the user interface button 106 presented to the user 102 in response to an activity trigger. As an illustrative example, the user 102 can specify, through the application, that if the application detects that the user 102 has completed a run, the application is to generate a user interface button 106 that, if selected, causes the user device 104 to generate an order to a service for a user-defined sports drink (e.g., brand, size, flavor, etc.). In some embodiments, a user 102 can specify through the application that the application is to recommend an item to the user 102 in response to an activity trigger. This may cause the application installed on the user device 104 to transmit a request to a retail vendor service to obtain one or more recommendations based at least in part on the activities defined by the user 102. The application may store these recommendations in a cache on the user device 104 such that if an activity trigger is detected, the application may select a recommendation from the cache for use in creation of the user interface button 106.

In an embodiment, the application, in response to detection of the specified activity triggers, presents the user interface button 106 to the user 102 through the user device 104. For instance, the application may be configured to obtain measurements from the surrounding environment where the user device 104 is located and to analyze these measurements to determine whether the specified activity has been performed. The application installed on the user device 104 may be configured to interact with one or more peripheral devices to obtain these measurements. As an illustrative example, the application may obtain Global Positioning System (GPS) data from the user device 104 to determine any distances travelled by the user 102, as well as rates of speed for the distance travelled. The application may also obtain signal data from one or more accelerometers or motion sensors installed on the user device 104 to identify any movement of the user device 104. The application may utilize the data obtained from the one or more peripheral devices installed on the user device 104 to determine whether the specified activity has been performed. Additionally, or alternatively, the user device 104 may obtain sensor data from one or more other devices 108 that are not installed on the user device 104 but are otherwise communicatively coupled with the user device 104 to transmit the sensor data. For instance, as illustrated in FIG. 1, the user 102 may utilize a smartwatch or other heart monitoring device 108 to track the user's heart rate during the activity. The heart monitoring device 108 may transmit sensor data to the user device 104 that specifies the user's heart rate and any other information that may be collected by the heart monitoring device 108. In some embodiments, the application interacts with other applications installed on the user device 104 to obtain data necessary to determine whether the activity has been performed. For instance, the application may interact with a fitness application installed on the user device 104 that may be configured to map a user's activities, collecting caloric information, heart rate information, blood pressure information, and the like. The application may utilize this information from the fitness application to determine whether the activity has been performed.

In some embodiments, the application receives information from a retail vendor service that may be used as an activity trigger for presentation of the user interface button 106. For instance, if the user 102 has identified, through the application, that the activity trigger is that the user 102 has not ordered the specified item in a particular period of time, the application may transmit the activity parameters for this trigger to the retail vendor service. In response, the retail vendor service may evaluate user purchases over time to determine whether the user 102 has purchased the specified item during the particular period of time. If the user 102 has not purchased the item during the particular period of time, the retail vendor service may transmit information to the application that may serve as the activity trigger for presentation of the user interface button 106. In another embodiment, the application can obtain data from the one or more peripheral devices or applications of the user device 104 and transmit this data to the retail vendor service, which may utilize the data to determine whether the activity specified by the user 102 has been performed. The retail vendor service may transmit its determination to the application, which may determine whether to present the user interface button 106 or not.

If the application installed on the user device 104 detects the performance of the activity (e.g., button presentation triggers), the application may determine the configuration parameters of the user interface button 106, as specified by the user 102, and generate the user interface button 106. The application may present the user interface button 106 to the user 102 through the GUI of the user device 104. For instance, the application may present the user 102 with an iconic representation or other graphical representation of the user interface button 106. Alternatively, the application may generate a notification, such as a textual message, indicating that the application has detected performance of the activity. The notification may include one or more user interface buttons 106 that may be used by the user 102 to specify whether it would like to purchase the presented item or to ignore the notification. If the user opts to ignore the notification, the application may terminate the notification such that it is no longer visible through the GUI. It should be noted that in some embodiments, the user interface button 106 can be presented using non-graphical interfaces or a combination of graphical and non-graphical interfaces. For instance, in an embodiment, rather than present a GUI button for purchasing of an item, the application can transmit an audio message to the user 102 asking if the user 102 would like to purchase the item. The user 102 may utilize a microphone of the user device 104 to indicate approval or rejection of the purchase.

In some embodiments, the application implements a graphical control element (e.g., widget) that may be displayed on the GUI of the user device 104 for presentation of the user interface buttons 106 and/or a button that, when selected, may launch an interface of the application that may be used to configure the user interface buttons 106. If the application has not detected the activity trigger for presentation of the user interface buttons 106, the application may configure the graphical control element to display a user interface button that may be used to configure the user interface buttons 106 and define any activity triggers for these buttons 106. However, if the application detects an activity trigger, the application may update the graphical control element by removing the user interface button 106 for configuring the user interface buttons 106 and adding one or more user interface buttons 106 that correspond to the detected activity trigger.

In response to presentation of the user interface button 106 through the GUI of the user device 104, the user 102 may select the user interface button 106 to submit an order for the specified item. The application may detect selection of the user interface button 106 and determine whether the user 102 is authenticated for processing of the order. For instance, the user 102 may provide credential information that may be used by the application, in conjunction with the retail vendor service, to authenticate the user 102. The user 102 may not be required to provide credential information to the application if the user 102 has been previously authenticated by the application and a particular period of time has not elapsed, resulting in expiration of the authentication session for the user 102. If the authentication session is still active or the user 102 has provided an authentic set of credentials, the application may generate an item order request that may be processed to enable the user 102 to purchase the item identified in the user interface button 106. The application may transmit the item order request to the retail vendor service and, in some instances, await confirmation from the retail vendor service that the item order request has been processed by the retail vendor service.

The retail vendor service may obtain the item order request from the application and process the request to initiate delivery of the selected item to the user 102. For instance, in response to the item order request, the retail vendor service may access a customer profile of the user 102 to identify a preferred method of payment and a preferred shipping address for the item. The retail vendor service may transmit the item order request to an order dispatch service or other delivery service, which may prepare the identified item for delivery to the user 102. This order dispatch service may, based at least in part on the user's preferred shipping address or the user's current address as determined through detection of the location of the user device and the item to be delivered, determine an estimated delivery date for the item. The order dispatch service may provide this information to the retail vendor service, which may transmit the information to the application installed on the user device 104. The application may update the GUI, such as through the graphical control element or use of a notification window, to indicate a confirmation of receipt of the item order request as well as any delivery information that the user 102 may utilize to determine an estimated time of delivery for the ordered item.

Figure 2:
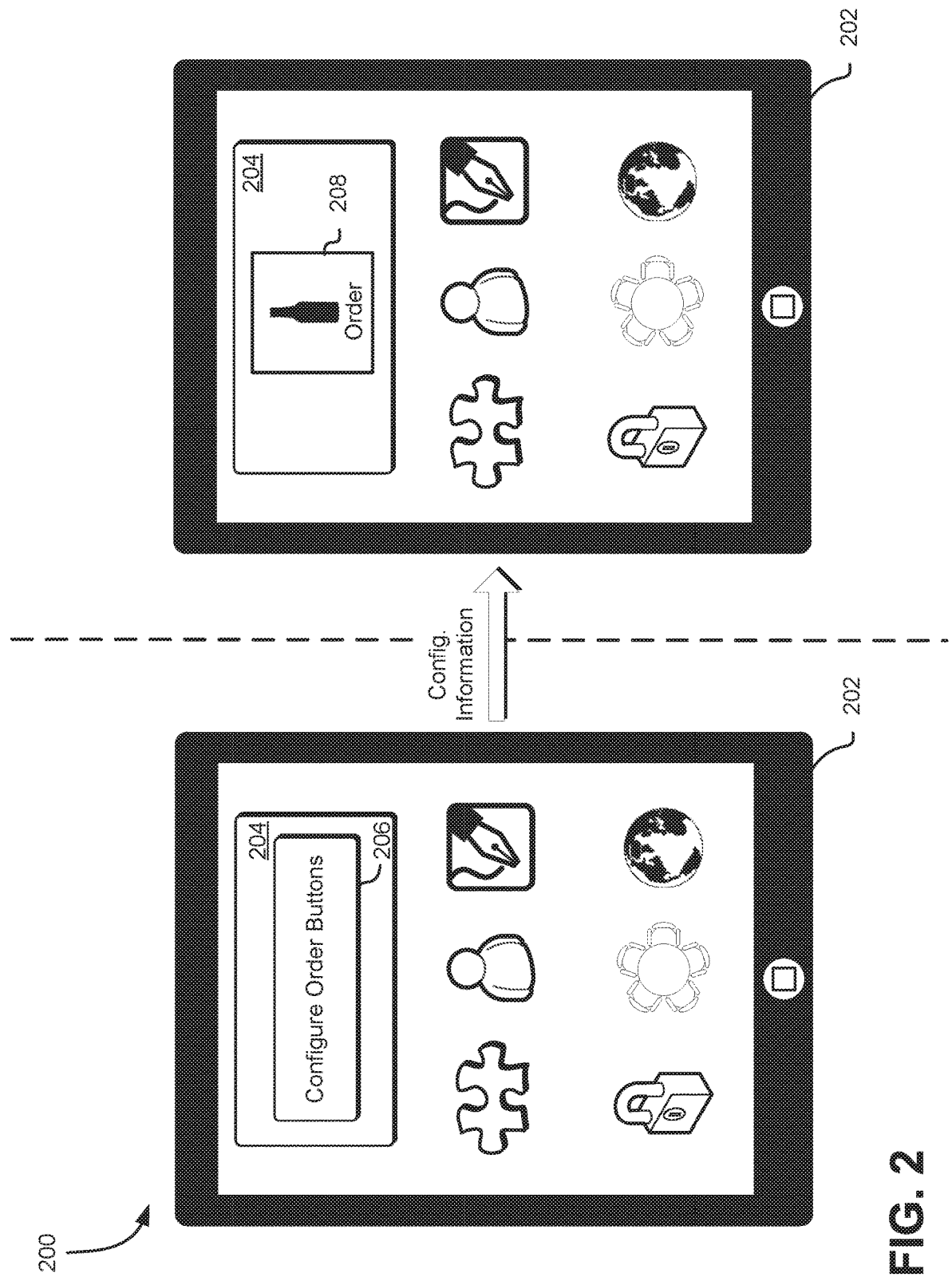
FIG. 2 shows an illustrative example of an environment in which a graphical control element of a graphical user interface is updated to include a user interface button in response to detection of one or more activities in accordance with at least one embodiment.

As noted above, an application installed on a user device may be configured to implement one or more graphical control elements that may be used to display one or more user interface buttons in response to detection of an activity trigger and to display a user interface button that may be used to configure or generate one or more user interface buttons that may be presented through the graphical control elements. Accordingly, FIG. 2 shows an illustrative example of an environment 200 in which a graphical control element 204 of a graphical user interface is updated to include a user interface button 208 in response to detection of one or more activities in accordance with at least one embodiment. In the environment 200, the GUI of a user device 202 may be configured to display one or more graphical control elements associated with a retail vendor application installed on the user device 202. For instance, the user of the user device 202 may install the retail vendor application on to the user device 202 and utilize the application to configure the appearance and settings for displaying the graphical control element 204 of the retail vendor application. For instance, the user may configure the size of the graphical control element 204 within the GUI of the user device 202, the user interface buttons to be presented through the graphical control element 204, the color and shape of the graphical control element 204, and the like.

Based at least in part on the configuration of the graphical control element 204 specified by the user during the initial setup of the application, the application may cause the GUI of the user device 202 to display the graphical control element 204. The graphical control element 204 may include a configure order button 206 that, in response to selection of the configure order button 206, may cause the application to execute a configuration window on the GUI that may be used to configure one or more user interface buttons 208 that may be displayed through the graphical control element 204 or through a segment of the GUI, as will be described in greater detail below. Through the configuration window, the user of the user device 202 may be presented with various options for configuring the user interface buttons 208. For instance, the user may utilize the configuration window to specify one or more activity triggers that may be used by the retail vendor application to determine placement of the user interface buttons 208. Additionally, the user may utilize the configuration window to specify what items are to be offered through the user interface buttons 208 in response to the activity triggers. For instance, a user may specify a specific item that may be presented to the user through the user interface buttons 208. Alternatively, the user may specify that the application may present one or more recommendations for an item based at least in part on the activity trigger.

The retail vendor application may be configured to operate as a background process on the user device 202, monitoring incoming signal data from the user device 202 and from other devices as well as other information from other applications installed on the device 202 to detect any activities performed by the user of the user device 202. For instance, if the user has defined an activity trigger to be the conclusion of a run having a minimum distance of a mile, the retail vendor application may evaluate GPS data from the user device 202, as well as any biometric information (e.g., heart rate, blood pressure, sodium levels, etc.) to determine whether the user has completed a run. If the application detects an activity trigger, the application may determine, based at least in part on the user-defined parameters for the user interface button 208, a configuration for the user interface button 208. For example, if the user has specified that a specific item is to be offered using a user interface button 208 presented through the graphical control element 204, the application may replace the configure order button 206 with the user interface button 208. This user interface button 208 may include an iconic representation of the specific item specified by the user, as well as other elements that may denote that the button 208 may be used to order the identified item.

If the user selects the user interface button 208 presented on the graphical control element 204, the application may detect the selection of the button 208 and prepare a purchase request on behalf of the user of the user device 202. The purchase request may specify the item to be purchased, as well as user information that may be used to identify a customer account of the user. The application may transmit the purchase request to the retail vendor service, which may utilize the user information included within the request to identify the user's customer account. The customer account may specify the user's shipping address as well as payment information that may be used for the purchase request. The retail vendor service may process the purchase request and transmit a notification to the application, providing confirmation of the purchase request and, if available, an estimated delivery date for the purchased item. This may cause the application to update the graphical control element 204 or generate a new notification window on the GUI of the user device 202 to confirm the purchase request and provide the user with the estimated delivery date for the purchased item. In some embodiments, the button 208 is associated with an item that has been paid for in advance, such as through a subscription service. Thus, if the user selects the button 208, the retail vendor service may determine that user has an active subscription for the item and prepare the item for delivery to the user without need to obtain payment information.

In an embodiment, the user can select the configure order button 206 to configure one or more user interface buttons 208 that can be used for any purpose specified by the user and at any time. For instance, through a configuration window generated in response to selection of the configure order button 206, the user can specify configuration information that may be used to determine the presentation of the one or more user interface buttons 208. Further, the user may specify the purpose of each of the one or more user interface buttons 208. As an illustrative example, the user can configure a user interface button 208 such that if the user interface button 208 is selected, the user device 202 may transmit an order request for an item to a service on behalf of the user. This user interface button 208 may be available to the user through the graphical control element 204 or other feature of the GUI unless the user later changes the configuration of the user interface button 208 or removes the user interface button 208 altogether.

Figure 3:
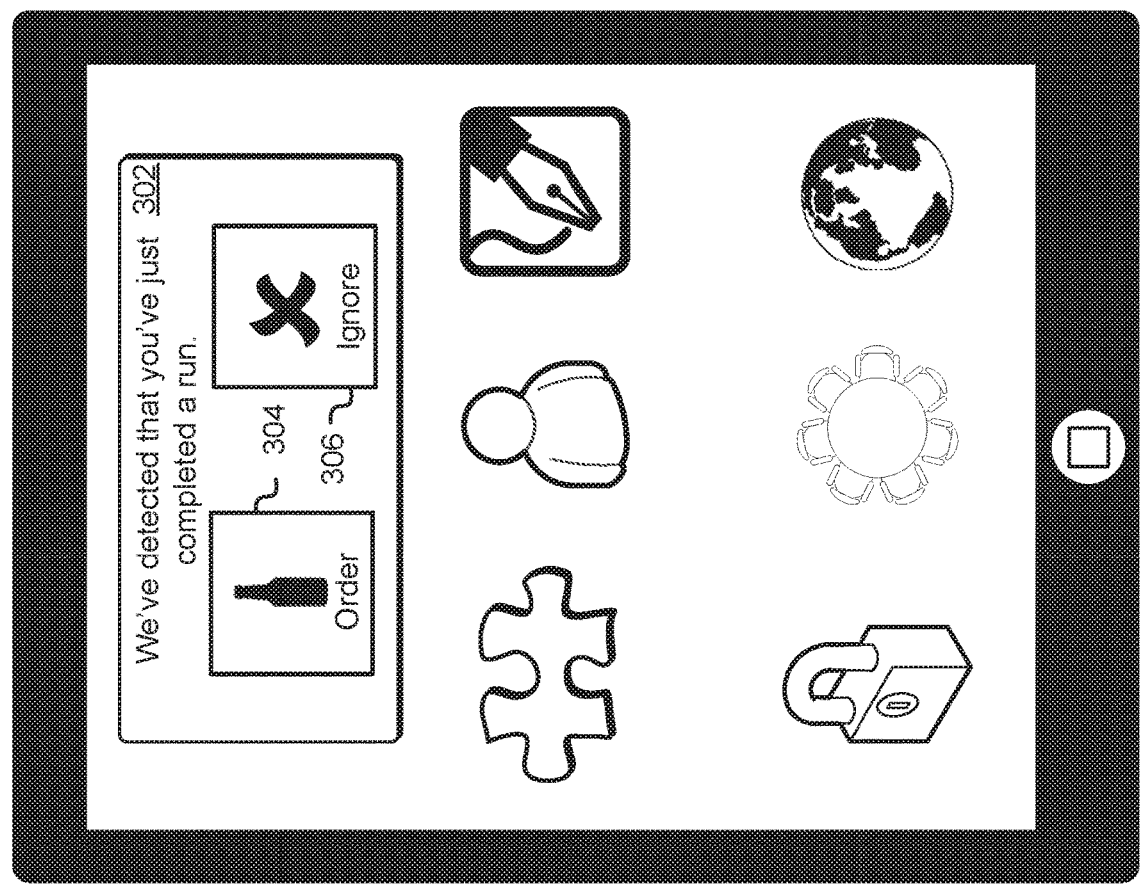
FIG. 3 shows an illustrative example of a graphical user interface in which a notification window including one or more user interface buttons is presented in response to detection of one or more activities in accordance with at least one embodiment.

In some embodiments, the retail vendor application utilizes one or more notification windows within the GUI to present users with the user interface button, as well as other textual information that may be useful to the user. The one or more notification windows may be generated by the retail vendor application without use of configuration information specified by the user. For instance, the application may be configured to evaluate signal data from a plurality of different peripheral devices of the user device and other applications installed on the user device to determine an activity being performed by the user. The application may generate one or more recommendations based at least in part on the activity being performed by the user and present the user interface button to the user. Accordingly, FIG. 3 shows an illustrative example of a graphical user interface 300 in which a notification window 302 including one or more user interface buttons 304, 306 is presented in response to detection of one or more activities in accordance with at least one embodiment.

As noted above, the user of the user device may install a retail vendor application on the user device that may be used to monitor user activity to provide one or more user interface buttons that may be used by the user to purchase one or more items. The retail vendor application may be configured to operate as a background process of the user device, monitoring signal data from one or more peripheral devices and from other applications installed on the user device to identify one or more activities being performed by the user. In some examples, the application includes a database or cache of recommendations that may be generated in response to different activities performed by the user. For instance, if the user is engaged in a run or hike, the application may identify one or more recommendations associated with a run category and select a recommendation for a particular item. In some embodiments, the application can process the signal data obtained from the various peripheral devices and/or other applications installed on the device to prepare a summary of the data collected over time. The application may provide this summary to the retail vendor service, which may process the summary and identify one or more activities performed by the user of the user device. The retail vendor service may further transmit one or more recommendations for items that can be offered to the user that may be related to the identified one or more activities. In yet another example, the retail vendor service itself may evaluate the user's customer profile, including any purchases, to detect an activity trigger that may result in presentation of the user interface button 304. The retail vendor service may transmit a request to the application installed on the user device to generate a user interface button 304 based at least in part on the detected activity trigger and any recommendations provided by the retail vendor service.

In response to a request from the retail vendor service or in response to detecting performance of a particular activity, the application may generate a notification window 302 within the GUI 300 to present the user with one or more user interface buttons 304, 306. The notification window 302 may include a textual message that may specify the activity performed by the user of the device. Further, the notification window may include a user interface button 304 that may be used to purchase a particular item identified in the user interface button 304. For instance, the retail vendor application may evaluate the one or more recommendations to identify an item that may be appealing to the user at the end of the identified activity. The user interface button 304 may be generated such that it identifies the item recommended by the retail vendor application.

In addition to the user interface button 304, the retail vendor application may provide, within the notification window 302, an ignore button 306, which the user may utilize to dismiss the notification window 302 without submitting an order to purchase the item identified in the user interface button 304. In some embodiments, if the user selects the ignore button 306, the retail vendor application may prevent further display of the notification window 302 in response to the identified activity. Thus, if the user performs the activity again, the retail vendor application may not present the user with the notification window 302 or the user interface button 304.

In an embodiment, the retail vendor application will present the user with an option, through the notification window 302, to configure a user interface button 304 that may be presented to the user in response to future, similar activity triggers. The retail vendor application may notify the user, through the notification window 302, that it has detected that the user has completed an activity. Additionally, the retail vendor application may present a sample user interface button that may be presented to the user in response to future detections of completion of the activity. The user may select the button to access a configuration window of the application to configure the user interface button 304. The user may specify the particular item to be offered through the user interface button 304, the activity triggers for presentation of the user interface button 304, and the method for presentation of the user interface button 304. Alternatively, if the user does not want to configure a user interface button 304 for the particular activity, the user may select the ignore button 306 to dismiss the notification window 302 and prevent further presentation of the notification window 302 in response to the activity unless the user explicitly changes the activity triggers through the application.

Figure 4:
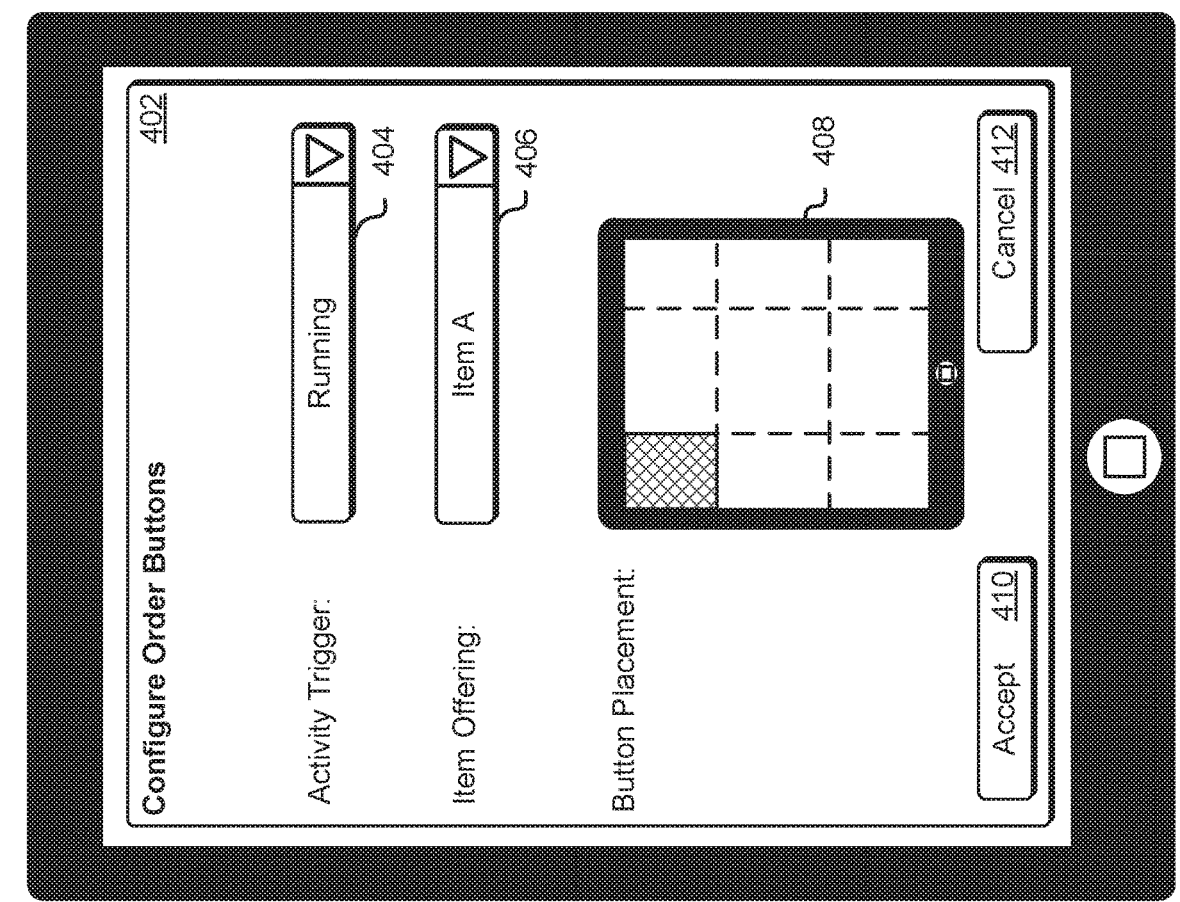
FIG. 4 shows an illustrative example of a graphical user interface in which an application is utilized to configure one or more user interface buttons in accordance with at least one embodiment.

As noted above, a user may utilize the retail vendor application to configure one or more activity triggers for presentation of a user interface button. In addition to defining the activity triggers, the user may utilize the retail vendor application to configure which items are to be associated with the item graphical user interface buttons, whether specific items as defined by the user or recommendations of items that may be ordered, as selected by the retail vendor application and/or the retail vendor service. Accordingly, FIG. 4 shows an illustrative example of a graphical user interface 400 in which an application is utilized to configure one or more user interface buttons in accordance with at least one embodiment.

Through the GUI 400, the user may select a graphical representation of the retail vendor application to access a configuration window 402, which the user may utilize to configure one or more user interface buttons. Through the configuration window 402, the retail vendor application may provide the user with a variety of options that may be used to configure the various triggers that the application may use to determine whether to present the one or more user interface buttons. For instance, as illustrated in FIG. 4, the retail vendor application may provide, through the configuration window 402, an activity trigger drop down menu 404. The activity trigger drop down menu 404 may specify a variety of options for activity triggers that may be utilized to determine whether to display a particular user interface button. For instance, a user of the application may specify that an activity trigger includes detection of the user completing a run or "running." This may cause the retail vendor application to monitor one or more peripheral devices and other applications installed on the device to determine whether the user has completed a run. For example, the retail vendor application may evaluate GPS data obtained from the device to calculate distance travelled and the velocity during which the distance was travelled. Further the retail vendor application may evaluate biometric information from other applications installed on the device, such as heart rate, blood pressure, sodium levels and the like. Additionally, or alternatively, the retail vendor application may detect that the user has executed a particular fitness application installed on the device, which, when terminated, may denote the end of the activity, resulting in detection of the activity trigger.

In some embodiments, the retail vendor application can additionally detect activity triggers that are not specified by the user. For instance, the retail vendor application may receive an indication, from the retail vendor service, that the user has not purchased a particular item that the user would usually purchase at particular time intervals. In response to this indication, the retail vendor application may generate a user interface button that may be used by the user to purchase the item. Through the configuration window 402, the retail vendor application may present the user with one or more options to disable any activity triggers from the retail vendor service. Thus, if the retail vendor service detects that the user has not purchased a particular item over a certain time period, the retail vendor application may not present the user with a user interface button in response to this detection. Alternatively, the user may specify how the user interface button is to be presented to the user in response to the indication from the retail vendor service through the GUI 400.

The retail vendor application may further provide, through the configuration window 402, an item offering drop down menu 406, which the user may utilize to select a specific item that is to be presented to the user through the user interface button. If the user selects, through the item offering drop down menu 406, a specific item that is to be presented, the application may update the configuration window 402 to include a hypertext link to a retail vendor service website, which the user may utilize to select the specific item. The retail vendor application may receive, from the retail vendor service or through observation of the user's interactions with the website, the selection of the specific item to be identified within the user interface button when presented to the user.

Through the item offering drop down menu 406, the user may also be presented with an option to have the retail vendor application recommend a particular item for purchase, which may be presented to the user through the user interface button. For instance, based at least in part on the one or more activity triggers specified, the retail vendor application may determine a recommendation for an item that may be desirable to the user upon performance of the activity detected. For instance, if the user has completed a run, the retail vendor application may recommend, through the user interface button, a sports drink or nutrition bar that the user may consume after a run. The retail vendor application may obtain these recommendations from the retail vendor service. For instance, the retail vendor application may transmit the specified activity triggers to the retail vendor service, which may maintain a set of recommendations for any possible activity trigger that may be detected by the retail vendor service or the application. The retail vendor service may provide these recommendations to the application installed on the user device. In response to obtaining these recommendations, the application may cache the applications on the user device. Thus, if the activity trigger is detected, the application may access the cache and select an item recommendation for the user. In an alternative embodiment, the application transmits signal data from the various peripheral devices installed on the device and information from the active applications to the retail vendor service, which utilizes this data and information to identify the activity performed and the recommendations to be provided to the application.

The application may further configure the configuration window 402 to include a button placement window 408, which may include a graphical representation of the user device and its GUI 400 that may be used to specify placement of the user interface button on the GUI 400. For instance, as illustrated in FIG. 4, the button placement window 408 may be divided into a number of segments representing different portions of the GUI 400. The user may select one of these segments to denote where the user interface buttons are to be placed when presented to the user by the retail service application. It should be noted that determination of button placement may be performed in additional and/or alternative ways. For instance, instead of a button placement window 408, the application may utilize a default placement and button sizing configuration to generate the user interface button and to place the button on the GUI 400. Alternatively, the retail vendor application may allow the user to determine the size of the user interface button and/or a graphical control element that may be used to display the various user interface buttons configured by the user.

In some embodiments, the application can configure the configuration window 402 to include one or more elements that may be used to illustrate the appearance of the user interface button as configured by the user. Through these one or more elements, the user may adjust the appearance of the user interface button as it would appear on the GUI 400 in response to detection of one or more activity triggers. Thus, the user may customize the user interface button according to the user's preferences.

The configuration window 402 may include an accept button 410, which the user may utilize to confirm the specified configuration of the user interface button and other preferences for presentation of the button. In response to selection of the accept button 410, the retail vendor application may initiate monitoring of signal data from the various peripheral devices installed on the device and any interactions with other applications installed on the device to detect any activity triggers. In some instances, the retail vendor application may transmit configuration information to the retail vendor service, which may provide item recommendations to the application based at least in part on the configuration specified by the user through the configuration window 402. Additionally, the retail vendor application may, in some instances, provide signal and application data to the retail vendor service, which may itself detect activity triggers. The configuration window 402 may further include a cancel button 412, which the user may utilize to cancel its configuration of the user interface button and terminate the configuration window 402.

Figure 5:
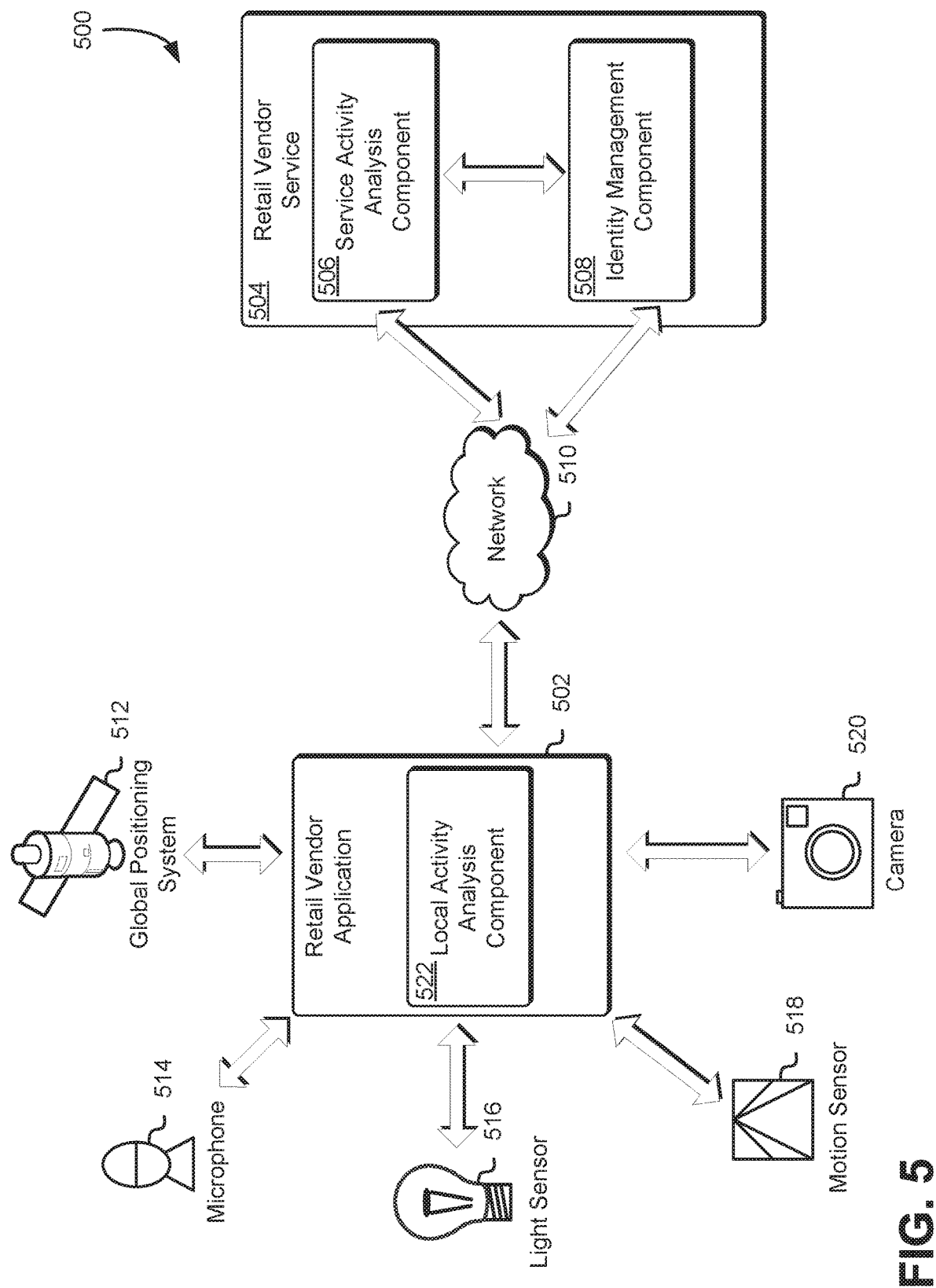
FIG. 5 shows an illustrative example of an environment in which data from various components is used to detect activity and generate one or more user interface buttons through a retail vendor application installed on a user device in accordance with at least one embodiment.

FIG. 5 shows an illustrative example of an environment 500 in which data from various components is used to detect activity and generate one or more user interface buttons through a retail vendor application 502 installed on a user device in accordance with at least one embodiment. As noted above, the user device may include one or more peripheral devices (e.g., sensors), which may be used to scan the surrounding environment and obtain signal data that may be used to determine whether the user of the device is engaged in an activity. The retail vendor application 502, installed on the user device, may be configured to initiate these one or more peripheral devices and obtain the signal data. The retail vendor application 502 may begin to utilize the one or more peripheral devices to scan the environment in response to a user's configuration of one or more user interface buttons through the application 502.

As illustrated in FIG. 5, the retail vendor application 502 may interact with one or more peripheral devices installed on the user device to scan the surrounding environment. For instance, in this particular illustrative example, the retail vendor application 502 may interact with at least five types of peripheral devices. The peripheral devices that may be installed on the user device, in this example, include a GPS antenna 512, a microphone 514, a light sensor 516, a motion sensor 518 and a camera 520, although not all embodiments of the present disclosure will include all such peripheral devices and additional peripheral devices may be installed on the computing device in addition to or as an alternative to the peripheral devices explicitly described herein.

The GPS antenna 512 may be installed on the user device to identify the location of the user device on Earth's surface. The GPS antenna 512, along with an integrated GPS receiver installed on the computing device, may be used to communicate with four or more satellites orbiting Earth to determine a distance between the GPS receiver and each of the four or more satellites. Further, the GPS receiver may receive the location of these four or more satellites orbiting the Earth's surface from each of these satellites in the form of radio signals. Accordingly, with this information, the GPS receiver may utilize three-dimensional trilateration to calculate the location of the GPS receiver on the Earth's surface. Thus, the GPS antenna 512 and GPS receiver may be utilized to determine whether the user device is being utilized in a private residence, public location or other location. Additionally the GPS antenna 512 and GPS receiver may be utilized to determine whether the user device is being utilized in an urban environment, a rural/wilderness environment, and the like.

The microphone 514 may be installed on the user device to detect and record audio input from the surrounding environment. The microphone 514 may be configured to convert acoustic waves into electrical signals, which a processor may utilize to measure the intensity of the acoustic waves. Further, the processor may record the electrical signals from the microphone 514 into a digital file, which may be used by an audio software application to analyze the recorded audio input and, based on the analysis, determine certain characteristics of the audio input. For instance, an audio software application may be able to discern whether one or more individuals are present and speaking to one another in the surrounding environment. Further, the audio software application may be able to discern whether other audio producing devices are operating within the surrounding environment. Accordingly, the microphone 514 may be utilized to determine whether the user device is being utilized in a public location, a noisy location, or a location where more than one individual is present.

The light sensor 516 may be installed on the user device to detect the intensity of light in the surrounding environment. For instance, the light sensor 516 may be configured to convert the light energy from the surrounding environment into an electrical signal. A processor may utilize this electrical signal to determine one or more characteristics of the surrounding environment. For instance, the electrical signal may be utilized to determine what kind of light sources are present in the surrounding environment. Accordingly, the light sensor 516 may be utilized to determine whether the user device is being utilized in a location with commercial, domestic or natural light sources.

The motion sensor 518 may be installed on the user device to detect the motion of an individual or other object within the surrounding environment. The motion sensor 518 may be configured to operate in various ways. For instance, the computing device may include a radar-based motion sensor, which may be configured to transmit a radio signal throughout the surrounding environment. Accordingly, the motion sensor 518 may receive a reflected signal from the environment. If, at any point, the reflected signal from the environment changes, the motion sensor 518 may detect the presence of a change in the environment. The retail vendor application 502 may utilize the motion sensor 518 to detect such a change and initiate the other peripheral devices to obtain new environment measurements.

The camera 520 may be installed on the user device for a variety of purposes. For instance, the camera 520 may be used to capture a pictographic (e.g., visual) representation of the surrounding environment, which may be used to determine, among other things, the characteristics of the surrounding environment, the activities being performed by the user of the device, the attire worn by the user that may be used to indicate performance of an activity, and the like. This pictographic representation of the surrounding environment may also be used to obtain additional, redundant data points as those produced by other peripheral devices. For example, the pictographic representation of the surrounding environment may be used to determine the light intensity of the surrounding environment. In another example, the camera 520 may be used in place of the motion sensor 518, such that the camera 520 may operate persistently and capture a pictographic representation of the surrounding environment should the camera 520 detect a change in the surrounding environment.

The retail vendor application 502 may include a local activity analysis component 522, which may include one or more processes or code for analyzing any signal data from the plurality of peripheral devices to determine whether an activity is being performed. For instance, the local activity analysis component 522 may utilize signal data from the GPS antenna 512 and GPS receiver to determine the location of the user device over time and the velocity at which the user device is moving based at least in part on changes to the signal data from the GPS antenna 512 and GPS receiver. Further, the local activity analysis component 522 may utilize pictographic representations of the surrounding environment and the user of the device to determine whether the user is engaged in an activity. Based at least in part on the signal data obtained from the various peripheral devices and other applications installed on the user device, the local activity analysis component 522 may detect one or more activity triggers that may denote performance of an activity by the user such that a user interface button may be generated for the user. The retail vendor application 502 may utilize the data gathered from the local activity analysis component 522, as well as the user's configuration specifications for the user interface button, to generate one or more user interface buttons. These user interface buttons may be used to present the user with an option to purchase one or more items through selection of the buttons. A user interface button may present the user with a specific item, as defined by the user, or a recommendation for an item that the user may purchase through selection of the button.

In some embodiments, the retail vendor application 502 transmits a request, over a communications network 510 (e.g., Internet), to a retail vendor service 504 to authenticate user credentials of the user to enable processing of one or more item order requests. The retail vendor service 504 may include an identity management component 508, which may obtain any credential information provided by the retail vendor application 502 to authenticate the user of the user device. If the user is authenticated by the identity management component 508, the retail vendor service 504 may transmit an indication to the retail vendor application 502 of the successful authentication of the user. The user may remain authenticated for a particular period of time, after which authentication of the user may expire and the user may be required to provide its credential information to the identity management component 508 for authentication.

In an embodiment, the retail vendor service 504 includes a service activity analysis component 506 configured to analyze a user's customer account or profile to determine whether a user interface button is to be presented to the user to enable the user to purchase one or more items. For instance, the service activity analysis component 506 may evaluate a user's purchase history and identify one or more items that the user may have purchased with some frequency. If there is a deviation from this frequency, the service activity analysis component 506 may identify this item and transmit a request to the retail vendor application 502 to generate a user interface button for the user that may be used to recommend purchase of the identified item. In another example, the user specifies, through the retail vendor application 502, that an activity trigger may include a variation in the frequency in which the user purchases a specific item. In response, the retail vendor application 502 may transmit this configuration information to the service activity analysis component 506, which may monitor the user's purchasing history to identify any variation in the frequency. In some embodiments, the retail vendor application transmits signal data from the various peripheral devices to the service activity analysis component 506, which may determine based at least in part on the signal whether an activity trigger can be identified. This may cause the service activity analysis component 506 to transmit a notification to the retail vendor application 502 indicating that an activity trigger has been detected. In response to the notification, the retail vendor application 502 may generate one or more user interface buttons for the user.

Figure 6:
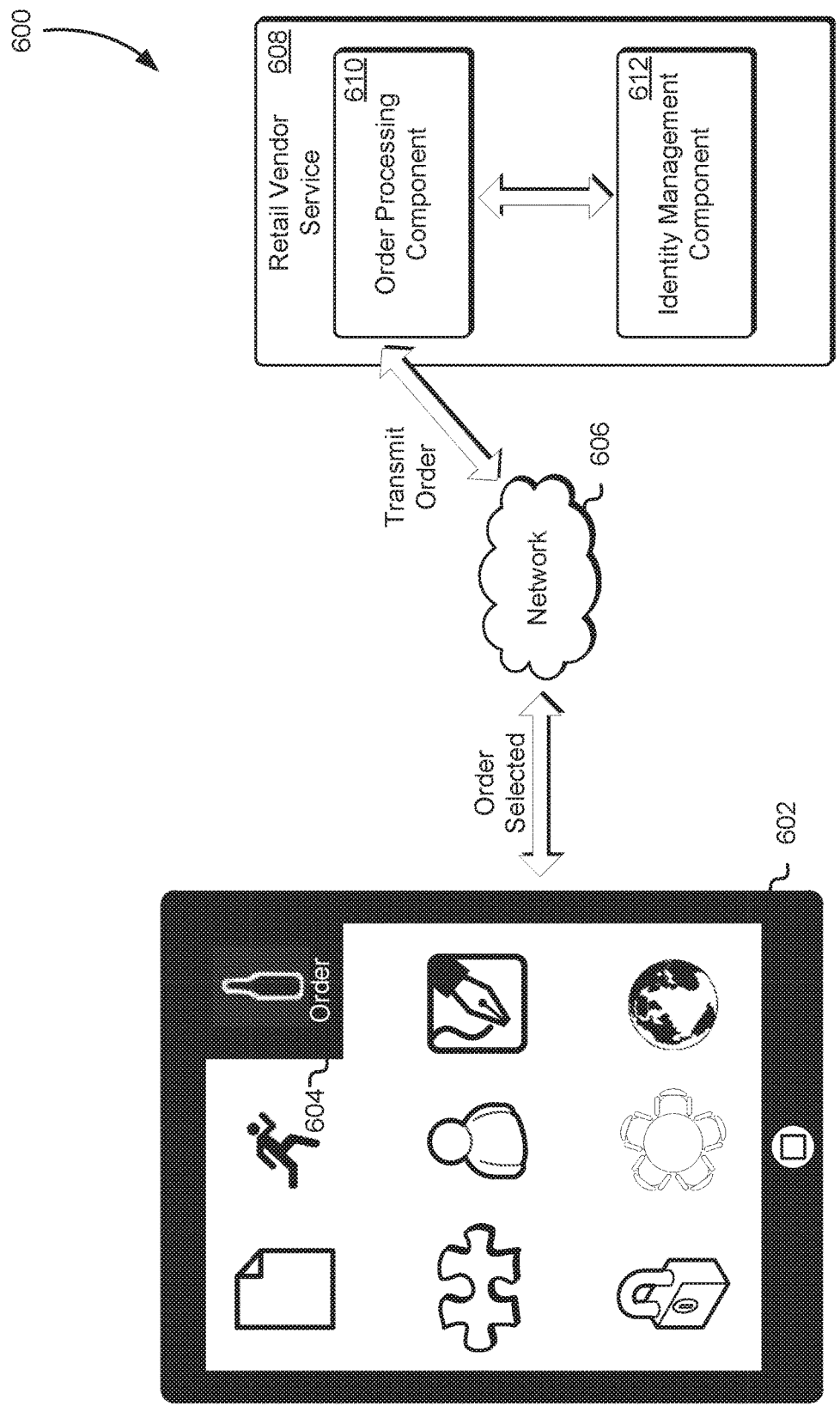
FIG. 6 shows an illustrative example of an environment in which an order is processed in response to selection of a user interface button in accordance with at least one embodiment.

FIG. 6 shows an illustrative example of an environment 600 in which an item order is processed in response to selection of a user interface button 604 in accordance with at least one embodiment. In the environment 600, a user, through a user device 602, may be presented with a user interface button 604 in response to detection of one or more activity triggers. For instance, if the user of the user device 602 has completed a run, the retail vendor application installed on the user device 602 may evaluate signal data from the various peripheral devices installed on the user device 602, as well as data from other applications installed on the user device 602, to detect the one or more activity triggers. The user interface button 604 may include an iconic representation of the particular item specified by the customer via configuration of the button 604 or of a recommended item selected by the retail vendor application or the retail vendor service 608 in response to the activity trigger.

The retail vendor application, at any time, may detect that a user has selected the user interface button 604, signifying that the user would like to order the item specified in the button 604. In response to the selection of the user interface button 604, the retail vendor application may transmit, through a communications network 606, a request to purchase the selected item. The request may be obtained by an order processing component 610 of the retail vendor service 608, which may be configured to authenticate the user (if the user has not been previously authenticated) and identify the parameters of the request for processing. For instance, the order processing component 610 may identify the item that is to be purchased, as well as an identifier of the user that may be used to identify, through an identity management component 612, a customer account for the user. The customer account may specify a preferred shipping address for delivery of the item and payment information that may be used to process a payment on behalf of the user for the item. The identity management component 612 may further be used to determine the authenticity of any credentials supplied by the user in the event that an authentication session has expired or the user has not been previously authenticated. If the credentials are not valid, the retail vendor service 608 may transmit a request to the user, through the retail vendor application, to provide credentials that may be used for authentication.

The order processing component 610 may communicate with a delivery service to determine an estimated delivery date for the item. Further, the order processing component 610 may communicate with a separate inventory service to determine whether the selected item is available for purchase and, if so, transmit a request to transfer the item to the delivery service for delivery to the user. The order processing component 610 may transmit a notification to the retail vendor application that includes a confirmation that the purchase request has been received and, if available, the estimated delivery date for the item. The retail vendor application may update the GUI of the user device 602 to display a notification that includes the confirmation, the estimated delivery date, and any other information that may be useful to the user to indicate successful processing of the purchase request.

In some embodiments, the retail vendor application presents the user interface button 604 to the user only if the item is available for delivery to the user. For instance, in response to detection of an activity trigger, the retail vendor application may transmit sensor data to the retail vendor service 608 to determine whether delivery of the item may be completed. For example, the sensor data may include GPS coordinates of the location of the user device 602. The retail vendor service 608 may determine whether deliver of the item may be completed to the location defined by the GPS coordinates. If delivery cannot be performed, the retail vendor service 608 may transmit a notification to the application indicating that delivery cannot be performed. This may cause the retail vendor application to forego presentation of the user interface button 604. In some examples, the retail vendor application may instead present the user of the user device 602 with advertisements for other items that may be of interest to the user.

Figure 7:
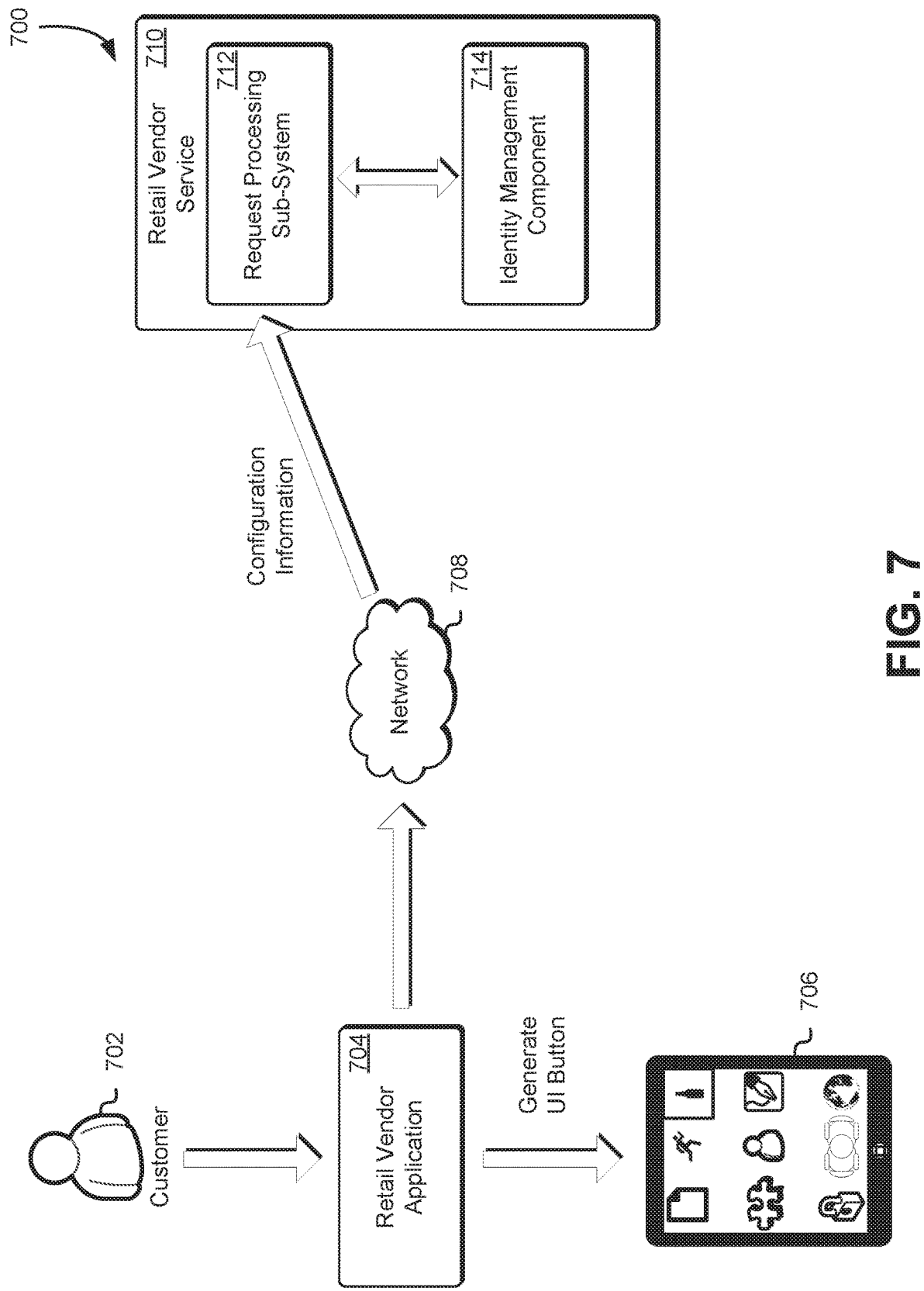
FIG. 7 shows an illustrative example of an environment in which one or more user interface buttons are configured based at least in part on customer preferences defined through an application installed on a user device in accordance with at least one embodiment.

FIG. 7 shows an illustrative example of an environment 700 in which one or more user interface buttons are configured based at least in part on customer preferences defined through an application installed on a user device 706 in accordance with at least one embodiment. In the environment 700, a customer 702 (e.g., user) may access, through a user device 706, a retail vendor application 704 to configure one or more user interface buttons. Through the retail vendor application 704, the customer 702 may specify one or more activities that may serve as activity triggers for presentation of one or more user interface buttons. Additionally, through the retail vendor application 704, the customer 702 may specify whether the user interface buttons are to provide the customer 702 an option to purchase a specific item specified by the customer 702 or an item recommended by the retail vendor application 704 based at least in part on the activity triggers detected. The customer 702 may utilize the retail vendor application 704 to further configure the presentation of the user interface buttons on the GUI of the user device 706.

In response to the customer 702 providing configuration information for the one or more user interface buttons, the retail vendor application 704 may determine whether the customer 702 has been authenticated. For instance, the retail vendor application 704 may transmit a request, through a communications network 708, to the retail vendor service 710 to determine whether the customer 702 is authenticated. The retail vendor service 710 may identify a customer account through an identity management component 714 and, through the customer account, determine whether the customer 702 is authenticated. If not, the customer 702 may be prompted to provide a set of credentials that may be used to authenticate the customer 702.

The retail vendor application 704 may further transmit the configuration information for the one or more user interface buttons to a request processing sub-system 712 of the retail vendor service 710. The request processing sub-system 712 may utilize the configuration information to determine whether to provide one or more recommendations to the retail vendor application 704 that may be used to generate the one or more user interface buttons. For instance, if the customer 702 has specified that the retail vendor application 704 may generate one or more user interface buttons that include recommendations for particular items based at least in part on the one or more activity triggers detected, the retail vendor application 704 may obtain, from the retail vendor service 710 one or more recommendations for items. The retail vendor application 704 may cache these recommendations within the user device 706 until needed to produce the user interface buttons that are to be presented to the customer 702 in response to detection of the one or more activity triggers. Alternatively, if the retail vendor application 704 detects the one or more activity triggers, the retail vendor application 704 may transmit a request that includes the configuration information to the retail vendor service 710, which, through the request processing sub-system 712, may generate the recommendations required by the retail vendor application 704 to generate the one or more user interface buttons.

Figure 8:
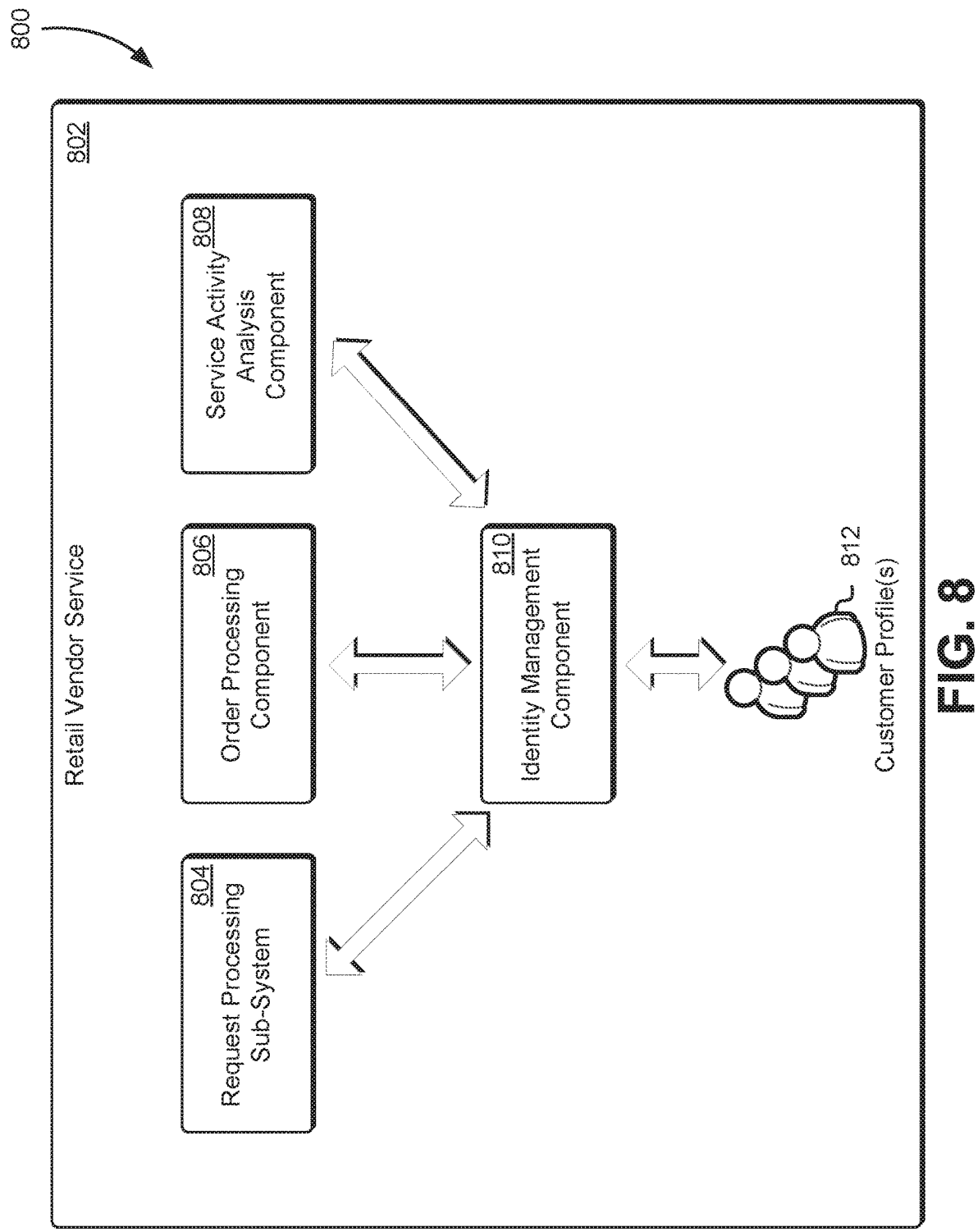
FIG. 8 shows an illustrative example of an environment in which various components of a retail vendor service are configured to implement and support ordering through use of one or more user interface buttons in accordance with at least one embodiment.

FIG. 8 shows an illustrative example of an environment 800 in which various components of a retail vendor service 802 are configured to implement and support item ordering through use of one or more user interface buttons in accordance with at least one embodiment. In the environment 800, the retail vendor service 802 may include a request processing sub-system 804, which may comprise one or more computer systems, applications installed on a computer system, or processes executed through a computer system configured to obtain configuration information from a retail vendor application installed on a user device to generate recommendations for items that may be offered to users based at least in part on the provided configuration information. For instance, through the retail vendor application, a user may specify one or more activity triggers that, if detected, may cause the retail vendor application to generate one or more user interface buttons that may be presented to the user through a GUI of the user device. The user may further configure the user interface buttons to present a recommended item based at least in part on the specified activity triggers. For instance, if the user has defined an activity trigger to be the conclusion of a run, the retail vendor application may generate a button that includes a recommendation for a particular brand of sports drink or nutritional bar. Similarly, if the user has not purchased a pair of running shoes after a significant period of time, the retail vendor application may provide a button that includes a recommendation for a new pair of running shoes.

In an embodiment, the retail vendor application transmits the user-provided configuration information for the user interface button to the request processing sub-system 804 to generate one or more recommendations for items that may be offered to the user based at least in part on the identified activity triggers. The request processing sub-system 804 may evaluate the provided activity triggers and identify, based at least in part on these activity triggers, items that are typically associated with the activities. For instance, the request processing sub-system 804 may evaluate purchasing trends for certain activities and identify the most popular items purchased by other users. Additionally, the request processing sub-system 804 may transmit a request to an identity management component 810 of the retail vendor service 802 to identify a customer account included in a customer profiles datastore 812 that may include the user's purchase history. The request processing sub-system 804 may evaluate the user's purchase history and determine whether the user has made previous purchases that may be used as recommendations that may be provided to the user in response to the activity triggers. In some embodiments, the activity trigger can include detection that the user has not purchased an item according to an identified frequency for purchase of the item. Thus, if the user has not purchased the item in a while, the request processing sub-system 804 may recommend that a user interface button be created that includes a recommendation for the item.

The retail vendor service 802 may further include an order processing component 806, which may comprise one or more computer systems configured to process incoming item purchase requests and coordinate with one or more delivery systems to ensure delivery of the item identified in the purchase requests. At any time, the order processing component 806 may receive a purchase request from a retail vendor application installed on a user device. The purchase request may be generated by the application in response to user selection of one or more user interface buttons displayed on the GUI of the user device. The purchase request may specify the item that is to be purchased, a preferred shipping address (if provided by the user), and a preferred method of payment (if provided by the user). The order processing component 806 may evaluate the purchase request and determine, through coordination with an inventory management system, whether the specified item is available for purchase. If it is, the order processing component 806 may interact with an identity management component 810 to obtain a customer profile of the user. This customer profile may be used to identify the preferred shipping method and payment information if not provided through the request. Additionally, the order processing component 806 may determine, through the identity management component 810, whether the user has been authenticated prior to processing of the purchase request. If the user has not been authenticated, the order processing component 806 may transmit a request to the application to request credentials from the user that may be used to authenticate the user. If the user is authenticated, the order processing component 806 may utilize the identified payment information to process payment for the item. Further, the order processing component 806 may transmit a request to the inventory management systems and the delivery systems to coordinate delivery of the item to the user.

The retail vendor service 802 may also include a service activity analysis component 808, which may include one or more computer systems configured to obtain and process incoming signal and application data from a retail vendor application installed on a user device to detect any activity triggers for generation of one or more user interface buttons. In an embodiment, a retail vendor application installed on a user device collects signal and application data from the user device and transmits the data to the service activity analysis component 808 for evaluation. The service activity analysis component 808 may evaluate the data and access, through an identity management component 810, a customer profile for the user to identify any activity triggers specified by the user through the application. Based at least in part on the processing of the obtained signal and application data, the service activity analysis component 808 may detect one or more activity triggers and transmit a notification to the application indicating detection of these one or more activity triggers. This may cause the retail vendor application installed on the user device to generate one or more user interface buttons for particular items that are to be presented to the user based at least in part on the detected activity triggers and the user's preferences for selection of items to be presented.

Figure 9:
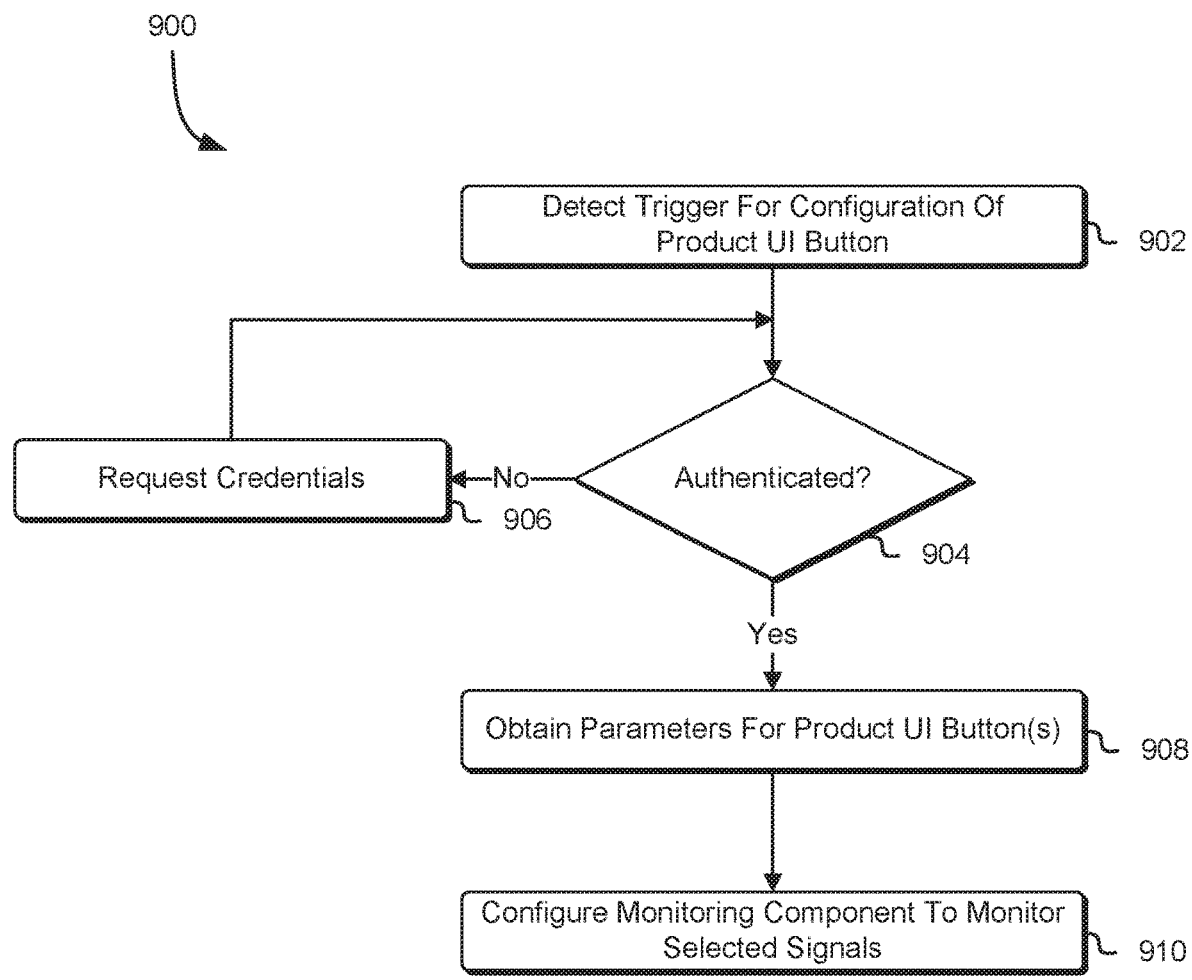
FIG. 9 shows an illustrative example of a process for configuring a monitoring component to monitor selected signals to identify one or more activities in response to configuration of at least one user interface button in accordance with at least one embodiment.

As noted above, a user of a user device may utilize a retail vendor application to configure one or more user interface buttons that may be presented to the user in response to one or more activity triggers. Alternatively, the retail vendor application may monitor use of the user device to identify any triggers that may be used for the configuration of one or more user interface buttons. For instance, if the retail vendor application detects that the user has completed a run, the application may present the user with an option to configure one or more user interface buttons that may be presented to the user in response to subsequent runs. Based at least in part on the parameters for the user interface buttons provided by the user, the retail vendor application may monitor various peripheral components and sensors of the user device to monitor for sensor data that may be used to detect one or more activity triggers denoting performance of the specified activity. Accordingly, FIG. 9 shows an illustrative example of a process 900 for configuring a monitoring component to monitor selected signals to identify one or more activities in response to configuration of at least one user interface button in accordance with at least one embodiment. The process 900 may be performed by a retail vendor application installed on a user device, which may be configured to interact with one or more peripheral devices and sensors to obtain sensor data, as well as a monitoring component (e.g., local activity analysis component) to monitor the obtained sensor data to detect the one or more activity triggers specified by the user.

The retail vendor application installed on a user device may be operating as a background process, evaluating interactions with the user device to detect 902 a trigger for configuration of a user interface button. For instance, the retail vendor application may detect that the user has utilized a fitness application installed on the device to track and monitor a particular activity. Additionally, or alternatively, the retail vendor application may detect that the user has utilized the device to purchase an item associated with an activity. In some embodiments, the retail vendor application obtains sensor data from one or more sensors of the device. Based at least in part on the obtained sensor data, the retail vendor application may determine that an activity has been performed, which may serve as a trigger for configuration of the one or more user interface buttons.

In response to detection of the trigger, the retail vendor application may provide the user with a configuration window that may be used to configure the one or more user interface buttons. For instance, the user, through the configuration window, may specify one or more parameters for the user interface button, such as the presentation of a user interface button on the GUI of the user device, the activity triggers used to determine when to provide the user interface buttons, and the items that are to be specified through the user interface button (e.g., recommended items, specific items, particular brands, etc.). In response to the user's definition of the one or more parameters for the user interface buttons, the retail vendor application may determine 904 whether the user is authenticated. For instance, the user may need to be authenticated in order to process purchase requests submitted through use of the one or more user interface buttons. The retail vendor application may also be required to provide sensor data to the retail vendor service to detect the activity triggers specified by the user or defined by the retail vendor service. The retail vendor service may require that the user be authenticated before performing such analyses.

If the user cannot be authenticated, the retail vendor application may request 906 that the user provide a set of credentials that may be used to authenticate the user. The retail vendor application may provide these credentials to the retail vendor service, which may evaluate the set of the credentials to authenticate the user and transmit a notification to the retail vendor application that the user has been authenticated. In some embodiments, if the user is unable to provide a valid set of credentials, the retail vendor application can terminate the user's request to configure one or more user interface buttons. In an alternative embodiment, the retail vendor application can continue to prompt the user for a valid set of credentials until a valid set of credentials are provided and successfully authenticated by the retail vendor service.

The retail vendor application may obtain 908 the various parameters specified by the user for creation of the user interface buttons and, based at least in part on these various parameters, configure 910 a monitoring component, such as a local activity analysis component of the application or a service activity analysis component of the retail vendor service, to monitor incoming sensor data from the sensors installed on the user device and other applications of the device. For instance, if the user has specified through the application that the conclusion of a run may be considered an activity trigger for presentation of the one or more user interface buttons, the retail vendor application may configure the local activity analysis component to analyze sensor data from a GPS antenna, a motion sensor, a camera and any other peripheral devices installed on the user device that may be used to determine whether the user has completed a run. Additionally, the retail vendor application may configure the local activity analysis component to monitor use of other applications, such as fitness applications, to determine whether the user has been engaged in the specified activity. In some embodiments, the retail vendor application is configured to transmit sensor data to a service activity analysis component of the retail vendor service, which may use the sensor data to detect the specified activity triggers.

Figure 10:
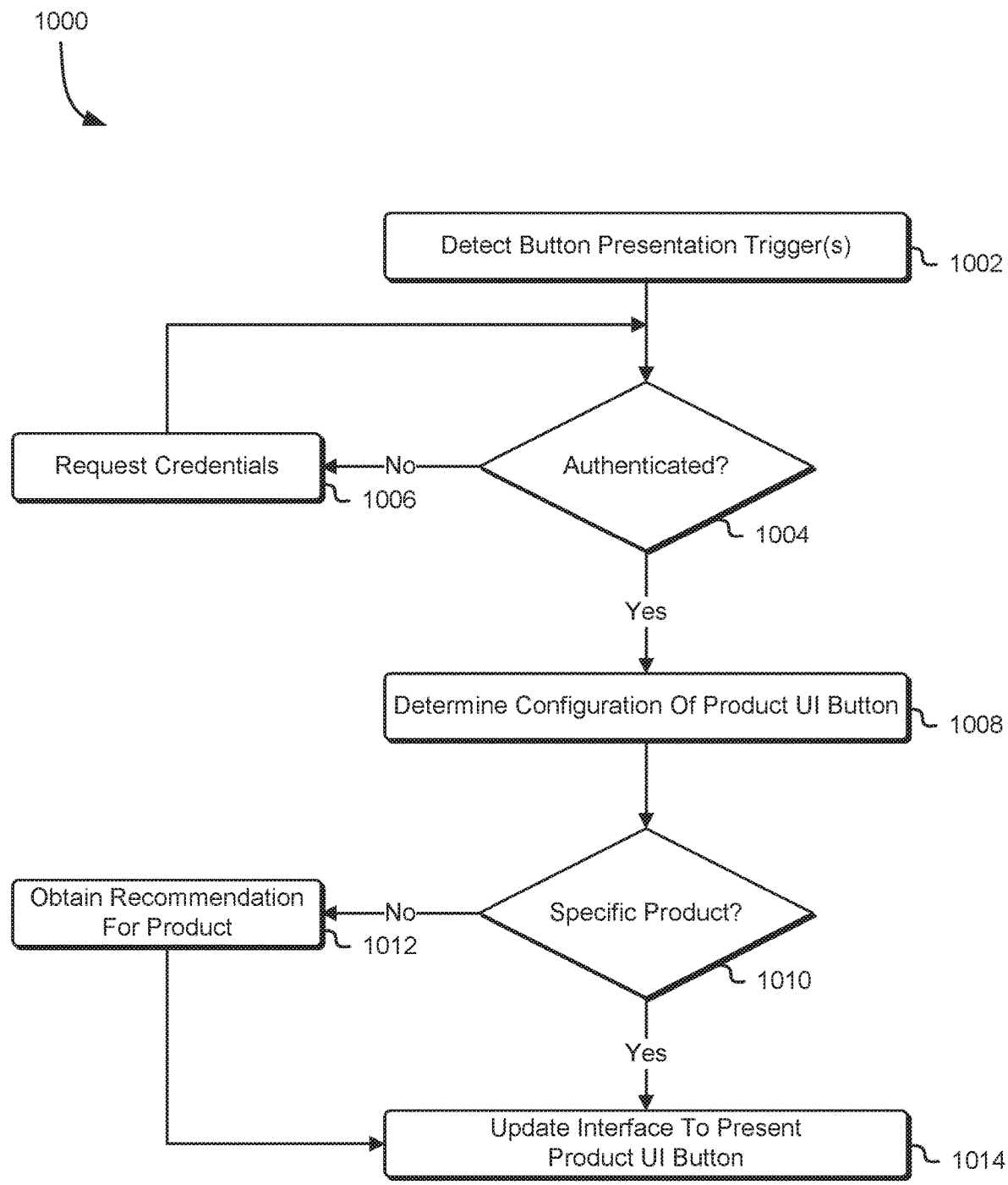
FIG. 10 shows an illustrative example of a process for updating a graphical user interface to present a user interface button in response to detection of one or more button presentation triggers in accordance with at least one embodiment.

As noted above, the retail vendor application may detect one or more activity triggers that may be used to determine whether to present one or more user interface buttons are configured by the user of by the application itself. Based at least in part on the configuration parameters of the one or more user interface buttons, the retail vendor application may determine whether to generate a user interface button that presents a particular item defined by the user or a recommendation for an item based at least in part on the detected activity trigger. Accordingly, FIG. 10 shows an illustrative example of a process 1000 for updating a GUI to present a user interface button in response to detection of one or more button presentation triggers in accordance with at least one embodiment. The process 1000 may be performed by the retail vendor application installed on the user device. In some embodiments, the process 1000 can be performed by the retail vendor application and a retail vendor service, which may utilize sensor data from the user device to detect any activity triggers.

The retail vendor application, through a local activity analysis component, may be configured to evaluate sensor data from one or more peripheral devices installed on a user device and application data from other applications installed on the user device to detect 1002 one or more button presentation triggers, such as activity triggers, that may be used to determine whether to present the user with a user interface button. For instance, in response to one or more configuration parameters defined by the user through a configuration window of the application, the retail vendor application may identify one or more button presentation triggers that, if detected, may cause the application to present the user with a user interface button. In some embodiments, the retail vendor application transmits sensor and application data to a service activity analysis component of the retail vendor service, which may utilize the data to detect 1002 the one or more button presentation triggers. If the service activity analysis component detects a button presentation trigger, the component may transmit a notification to the retail vendor application indicating detection of the button presentation trigger.

In response to detection of a button presentation trigger, the retail vendor application may determine 1004 whether the user of the device is authenticated. For instance, in order to submit a purchase order on behalf of the user, the user may need to be authenticated to ensure that the purchase order is from the user associated with a specified user account. In some embodiments, the retail vendor application obtains a user's set of credentials and initiates an authentication session on behalf of the user. While the authentication session is active, the user may not be required to provide its set of credentials in response to selection of a user interface button or in response to detection of the button presentation triggers.

If the user cannot be authenticated, the retail vendor application may request 1006 that the user provide a set of credentials that may be used to authenticate the user. The retail vendor application may transmit the obtained set of credentials to the retail vendor service, which may authenticate the set of credentials and initiate an authentication session for the user such that, while the authentication session is active, the user may not be required to provide the set of credentials. In some embodiments, the retail vendor application will continue to request 1006 that the user provide a valid set of credentials until the user can be authenticated by the retail vendor service. Alternatively, if the credentials provided by the user cannot be authenticated, the retail vendor application may disregard the button presentation triggers.

If the user is successfully authenticated, the retail vendor application may determine 1008, based at least in part on configuration parameters defined by the user and/or the retail vendor service, the configuration of the user interface button. For instance, the retail vendor application may determine how the user interface button is to be presented to the user through the GUI of the user device. This may include the size and shape of the button, whether to present a notification window or update a graphical control element to present the user interface button, the one or more items to be presented through the button, and the like.

Based at least in part on the configuration information provided by the user and/or the retail vendor service, the retail vendor application may determine 1010 whether to present a user interface button that identifies a specific item or a recommendation for an item that may be purchased by the user. For instance, through a configuration window, a user may specify whether, in response to an activity trigger, the user is to be presented with a button that specifies a specific item selected by the user for purchase. Alternatively, the user may specify that the retail vendor application is to generate a recommendation for an item based at least in part on the activity trigger detected.

If the configuration information specifies that the user is to be provided with a recommendation for an item associated with the activity trigger, the retail vendor application may obtain 1012 a recommendation for an item that may be presented to the user through the user interface button. The retail vendor service may transmit a request to the retail vendor service to obtain a recommendation for an item based at least in part on the activity trigger detected. In some examples, the retail vendor application can obtain the recommendations from the retail vendor service in response to the user defining the configuration information for the button through the configuration window of the application. For instance, the application may transmit the configuration information to the retail vendor service, which may use this information to identify one or more items that may be recommended to the user. The retail vendor application may store these recommendations in a cache of the user device. Thus, the retail vendor application may obtain the recommendation for the item from this cache or directly from the retail vendor service in response to detection of the activity trigger.

If the retail vendor application determines that a specific item is to be presented through the user interface button or in response to obtaining a recommendation for an item that may be offered to the user, the retail vendor application may update 1014 the GUI of the user device to present the user interface button. The button may be presented to the user based at least in part on the parameters defined by the user through the configuration window. Further, the button may enable the user to select the button to submit a purchase order for the item offered through the user interface button.

Figure 11:
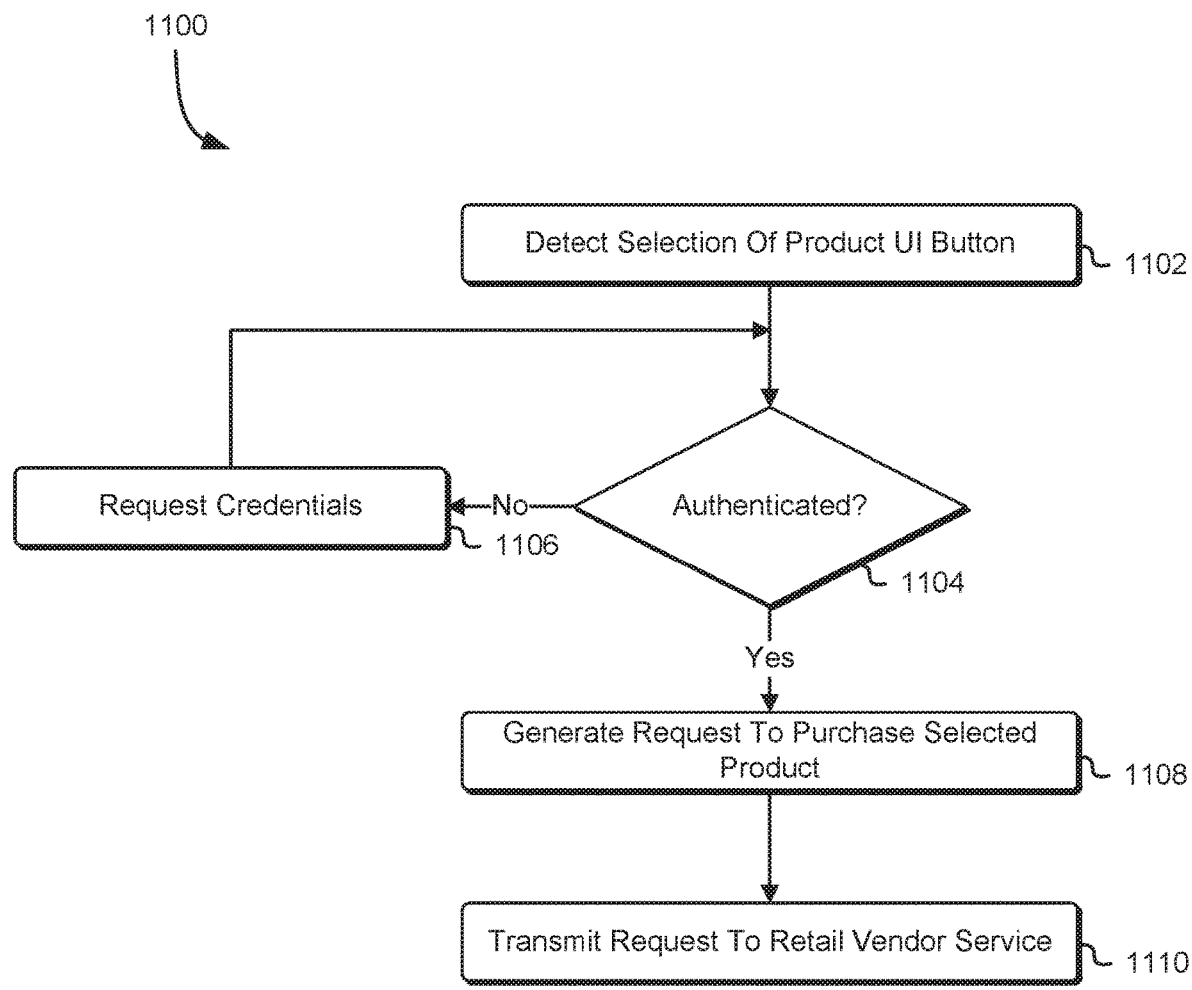
FIG. 11 shows an illustrative example of a process for submitting an order request to a retail vendor service in response to selection of a user interface button in accordance with at least one embodiment.

As noted above, a user of a user device may select a user interface button to submit a purchase request to a retail vendor service to purchase the item identified in the button. In response to this selection of the user interface button, the retail vendor application installed on the user device may generate the purchase request on behalf of the user and provide additional information to the retail vendor service that may be used to identify the user and the preferred delivery methods for delivery of the ordered item. Accordingly, FIG. 11 shows an illustrative example of a process 1100 for submitting an item order request to a retail vendor service in response to selection of a user interface button in accordance with at least one embodiment. The process 1100 may be performed by the aforementioned retail vendor application, which may generate the item order request in response to selection of a user interface button presented to the user through a GUI of the user device.

At any time, the retail vendor application may detect 1102 selection of a user interface button through a GUI of the user device. The user interface button may be associated with a particular item selected by the user for presentation through the button or recommended to the user based at least in part on an activity trigger used to generate the button. In response to selection of the user interface button, the retail vendor application may determine 1104 whether the user is authenticated. Similar to the process 1000 described above, in order for the application to submit a purchase order on behalf of the user, the user may need to be authenticated to ensure that the purchase order is from the user associated with a specified user account. As noted above, the retail vendor application may obtain a user's set of credentials and initiate an authentication session on behalf of the user. While the authentication session is active, the user may not be required to provide its set of credentials in response to selection of a user interface button.

If the user is not authenticated, the retail vendor application may request 1106 that the user provide a set of credentials that may be used to authenticate the user. In response to obtaining the set of credentials from the user, the application may transmit the set of credentials to the retail vendor service, which, through an identity management component, may attempt to authenticate the user. If the user is authenticated, the retail vendor application may initiate an authentication session for the user, which would eliminate the need for the user to provide the set of credentials while the session is active. If the user does not provide a valid set of credentials, the retail vendor application may prompt the user to provide a valid set of credentials until the user does so. In some examples, the retail vendor application can disregard the detection of the selection of the button if a valid set of credentials is not provided by the user.

If the user is successfully authenticated, the retail vendor application may generate 1108 a request, on behalf of the user, to purchase the selected item. The retail vendor application may specify, within the request, a user identifier that may be used by the retail vendor service to identify an account associated with the user and the item that is to be purchased. In some embodiments, the request can include a preferred shipping address and a preferred payment method as specified by the user during the configuration of the user interface button. This additional information may differ from the information specified in the user account but may override the information in the user account. The retail vendor application may transmit 1110 this request to the retail vendor service for processing of the request.

Figure 12:
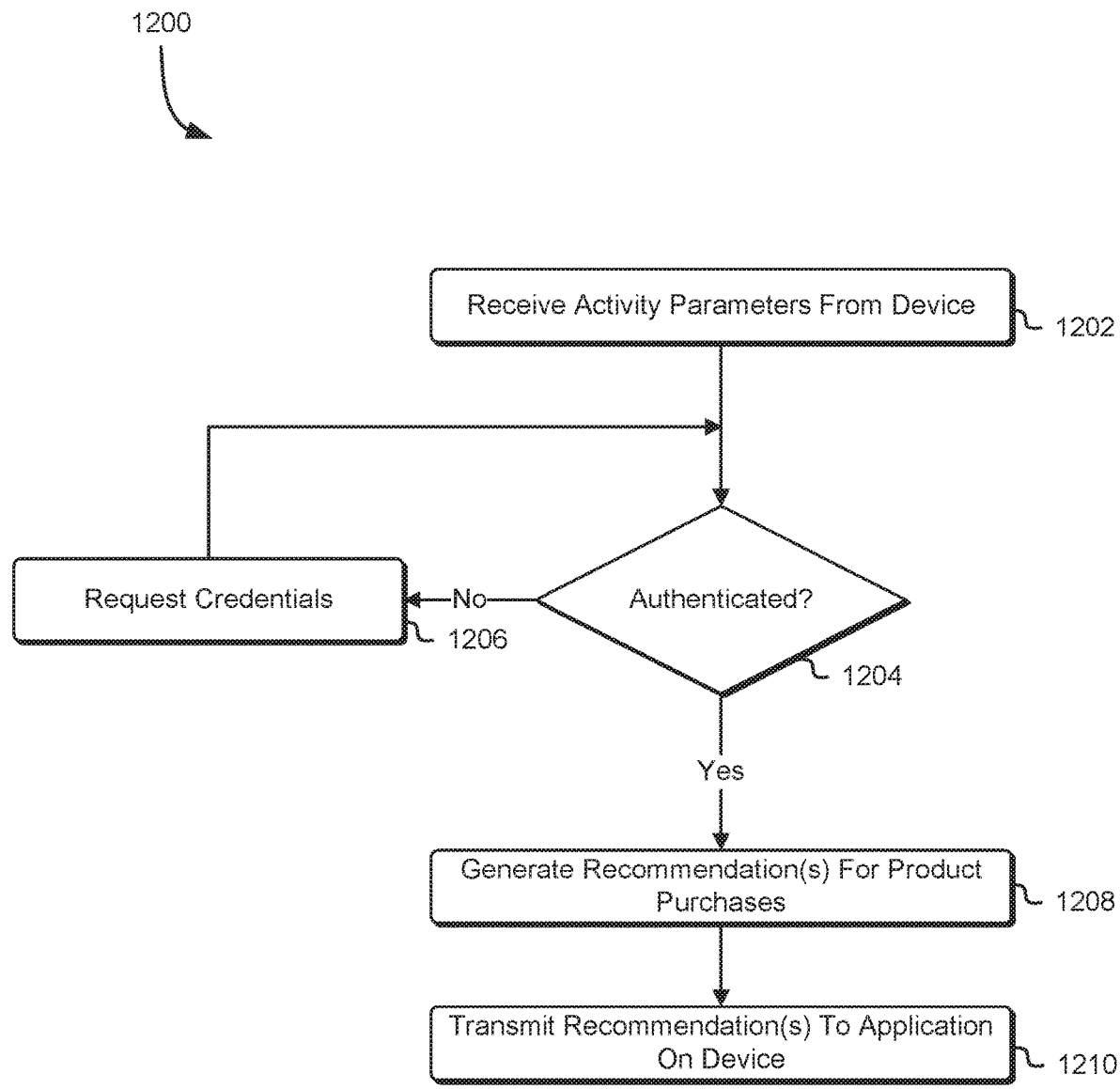
FIG. 12 shows an illustrative example of a process for caching one or more recommendations for items that can be offered to a user in response to certain activity parameters in accordance with at least one embodiment.

As noted above, a user of the retail vendor application may specify that the application may supply, through the use of one or more user interface buttons, recommendations for items that may be of interest to the user after performance of an activity. The retail vendor application may transmit a request to a retail vendor service to obtain one or more recommendations of items that may be offered to the user in response to an activity trigger. The retail vendor service may store these recommendations in a cache of the user device or otherwise present these recommendations to the user through the one or more user interface buttons. Accordingly, FIG. 12 shows an illustrative example of a process 1200 for caching one or more recommendations for items that can be offered to a customer in response to certain activity parameters in accordance with at least one embodiment. The process 1200 may be performed by the retail vendor service, which may communicate with a retail vendor application installed on a user device to obtain activity parameters from the user that may be used to generate recommendations of items that may be offered to the user.

At any time, a user of the user device may utilize the retail vendor application to configure one or more user interface buttons. For instance, through the application, the user may specify one or more activity triggers that, if detected, may cause the application to present the user with one or more user interface buttons for the purchase of an item. In some embodiments, a user can opt to have the retail vendor application supply the user, through a user interface button, with a recommendation for an item that may be desirable to the user. Alternatively, the retail vendor application, without user input, may collect activity information from the user device and utilize this information to identify a set of preferred activities of the user. The retail vendor application may compile these activity parameters on behalf of the user and transmit the activity parameters to the retail vendor service for generation of one or more recommendations of items. Thus, the retail vendor service may receive 1202 activity parameters from the user device.

Similar to the process 1000 described above, in order for the retail vendor service to generate one or more recommendations on behalf of the user, the user may need to be authenticated to ensure that the recommendations generated are for the user associated with a specified user account. Thus, the retail vendor service may determine 1204 whether the user can be authenticated. As noted above, the retail vendor application may obtain a user's set of credentials and initiate an authentication session on behalf of the user. While the authentication session is active, the user may not be required to provide its set of credentials. If the user cannot be authenticated, the retail vendor service may request 1206 that the user, through the application, provide a set of credentials to the service. In some embodiments, authentication of the user is not required to generate the one or more recommendations for the user based at least in part on the activity parameters from the user device.

If the user is authenticated, the retail vendor service may utilize the activity parameters to generate 1208 one or more recommendations for items that may be purchased by the user. For instance, the retail vendor service may identify, based at least in part on the activity parameters from the user device, one or more items that may be popular with other users that have performed similar activities. Additionally, or alternatively, the retail vendor service may evaluate the user's purchase history to identify any purchasing trends that may be used to generate the recommendations for items that may be desirable to the user. The retail vendor service may transmit 1210 the recommendations to the retail vendor application installed on the user device. This may cause the retail vendor application to cache the recommendations within the user device until needed to generate one or more user interface buttons in response to one or more activity triggers.

Figure 13:
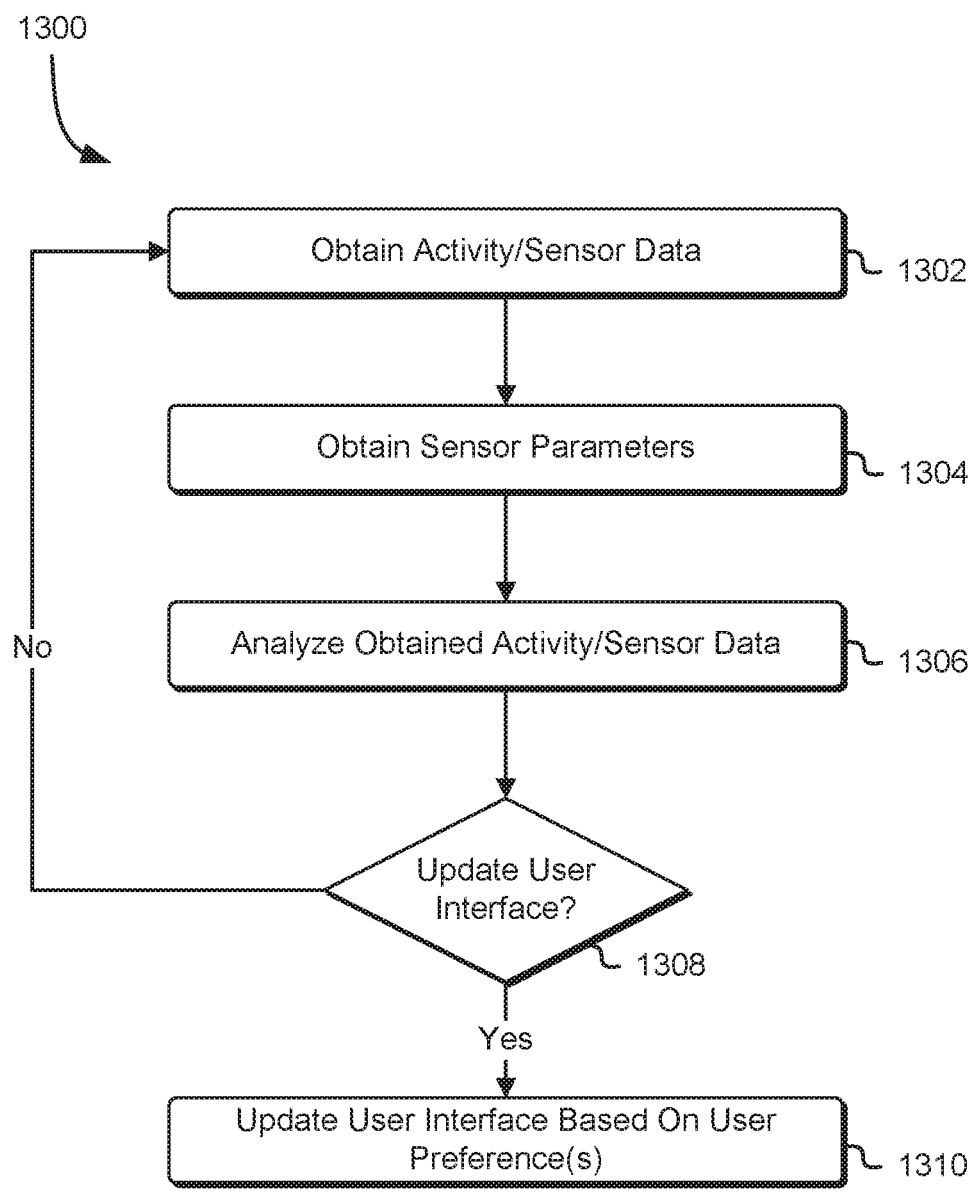
FIG. 13 shows an illustrative example of a process for analyzing activity data and sensor data to determine whether to update a user interface to present one or more user interface buttons in accordance with at least one embodiment.

As noted above, the retail vendor application may evaluate incoming activity and sensor data to determine whether to prompt the user as to whether the user would like to configure one or more user interface buttons. For instance, the application may be configured to identify any activities performed by the user and recommend creation of one or more user interface buttons based at least in part on the identified activities. Accordingly, FIG. 13 shows an illustrative example of a process 1300 for analyzing activity data and sensor data to determine whether to update a user interface to present one or more user interface buttons in accordance with at least one embodiment. The process 1300 may be performed by the aforementioned retail vendor application.

The retail vendor application may be configured to obtain 1302, from a variety of sensors installed on the user device and other applications installed on the device, activity and sensor data that may be used to determine whether a user of the device has been engaged in one or more activities. The retail vendor application may include one or more algorithms that may be used to analyze the obtained activity and sensor data to identify the activities performed by the user. Alternatively, the retail vendor application may obtain 1304 one or more sensor parameters for various activities that may be used to determine the activity being performed by the user. For instance, the sensor parameters may specify that if the GPS data indicates device movement of greater than one mile, while travelling at six miles per hour, the retail vendor application may determine that the user has been running.

Based at least in part on the obtained sensor parameters, the retail vendor application may analyze 1306 the obtained activity and sensor data to determine whether an activity has been performed. For instance, if the particular sensor parameters have not been met, the retail vendor application may determine that the activity corresponding to these parameters has not been performed by the user of the user device. However, if the obtained sensor parameters have been met, the retail vendor service may determine that the activity has been performed. The retail vendor application may use this determination of activity performance to determine 1308 whether to update the user interface per the user's specifications.

If the retail vendor application determines, based at least in part on the obtained activity and sensor data that the user interface is not to be updated, the retail vendor application may continue to obtain and process activity and sensor data to detect performance of any activities by the user. However, if the retail vendor application determines, based at least in part on the user's preference or the configuration of the application itself, that the user interface should be updated, the retail vendor application may update 1310 the user interface of the user device based at least in part on the user's preferences or the configuration of the application. For instance, if the user has specified, through the application, that the retail vendor application is to prompt the user in response to detection of an activity whether the user wants to generate one or more user interface buttons, the retail vendor application may update the GUI of the user device to present a notification to the user indicating that the activity has been detected and prompting the user to determine whether to configure and generate a user interface button.

Figure 14:
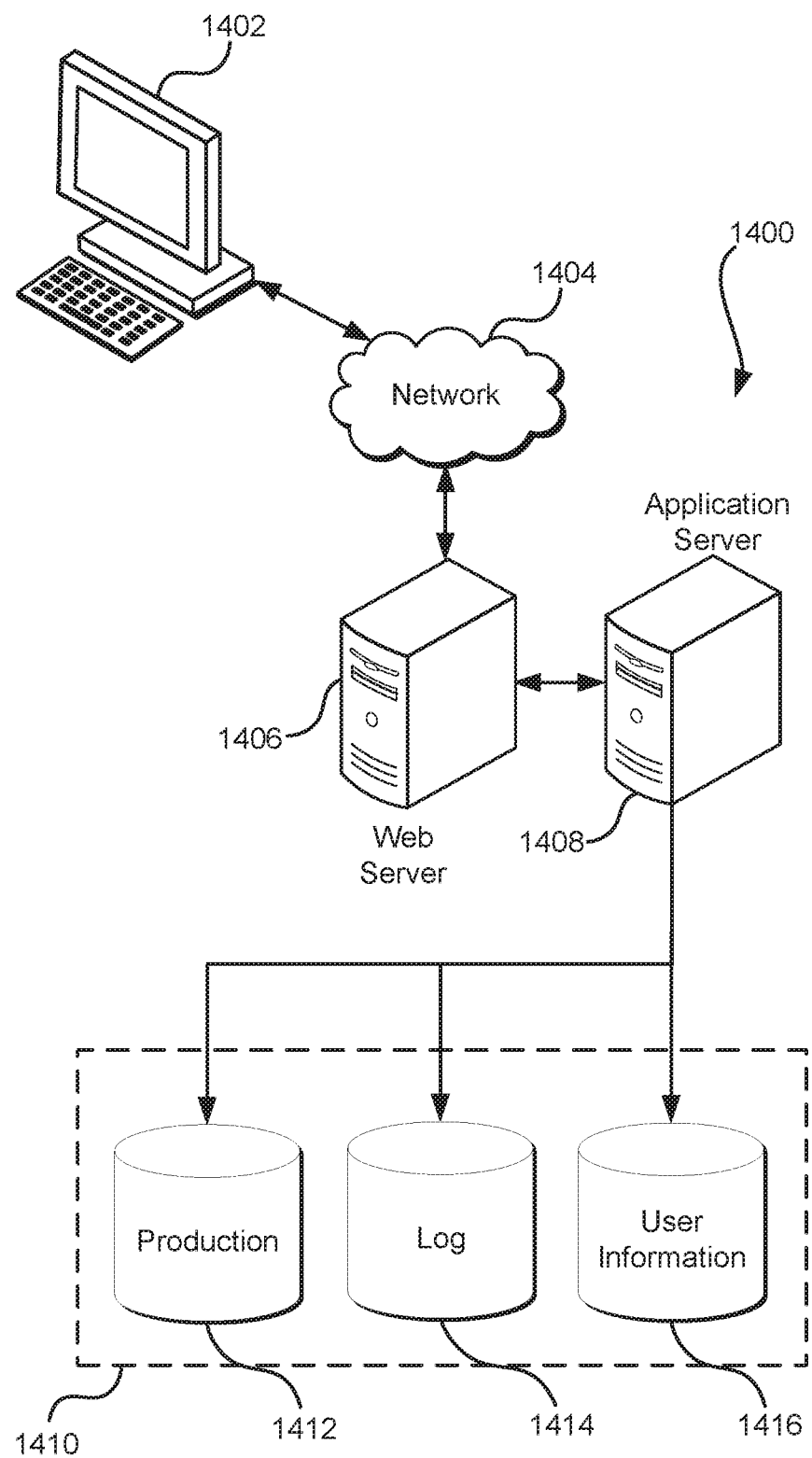
FIG. 14 shows an illustrative example of an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1402 and the application server 1408, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, C++, or any scripting language, such as Ruby, PHP, Perl, Python or TCL, as well as combinations thereof. The server(s) may also include database servers, including without limitation those commercially available from Oracle °, Microsoft °, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   detecting, based at least in part on first sensor data obtained from a sensor of a device, a first performance of an activity;
   in response to detecting the first performance of the activity, causing a graphical user interface of an application executed by the device to be modified to display a first graphical user interface component, the first graphical user interface component comprising a recommendation specifying an item available for use associated with the activity;
   obtaining, through a set of interactions with the first graphical user interface component, a set of parameters defining an activity trigger that, as a result of being detected by the sensor of the device, causes the application to modify the graphical user interface to display a second graphical user interface component enabling the application to place an order for the item, the set of parameters further defining a set of communications to be transmitted from the device to a service provider to place the order for the item on behalf of an account associated with the application;
   enabling the device to transmit the set of communications in response to an interaction with the second graphical user interface component;
   determining, based at least in part on second sensor data obtained from the sensor of the device, that a second performance of the activity satisfies the activity trigger;
   causing the second graphical user interface component to be displayed in the graphical user interface in response to determining that the second performance of the activity satisfies the activity trigger; and
   in response to the interaction with the second graphical user interface component, causing the set of communications to be transmitted to place the order for the item on behalf of the account.

2. The computer-implemented method of claim 1, wherein the second graphical user interface component includes an image of the item.

3. The computer-implemented method of claim 1, wherein
   the method further comprises:
      in response to detecting the first performance of the activity, transmitting a request to the service provider to obtain a set of recommendations for a set of items based at least in part on the activity;
      in response to obtaining the set of recommendations, causing the set of items to be displayed; and
      obtaining, through the graphical user interface, a selection of the item from the set of items.

4. The computer-implemented method of claim 1, wherein the method further comprising transmitting the second sensor data to a retail vendor service to evaluate the second sensor data such that the retail vendor service determines detection of the second performance of the activity.

5. A system, comprising:
   a first device comprising a sensor; and
   a second device comprising one or more processors, a user interface component, and memory storing executable instructions that, as a result of being executed by one or more processors, cause the one or more processors of the second device to:
      detecting, based at least in part on first sensor data objected from the sensor, a first performance of an activity,
      in response to the first sensor data from the sensor, obtain a configuration parameter for the user interface component, the configuration parameter specifying an activity threshold associated with a second performance of the activity determined based at least in part on information obtained from the sensor where satisfaction of the activity threshold causes the user interface component to be displayed by the second device and an action to be performed in response to an interaction with the user interface component, the action including at least transmitting a request to an external server to effectuate a workflow that results in delivery of a physical product indicated in the user interface component to a location affiliated with the second device;
      enable the second device to transmit the request to the external server in response to the interaction with the user interface component;
      determine, based at least in part on second sensor data obtained from the sensor of the first device, that the activity threshold has been met;
      cause a user interface of the second device to display the user interface component, the user interface component indicating a recommendation for the physical product; and
      as a result of detecting the interaction with the user interface component, cause the action to be performed by at least transmitting the request for the physical product to the external server.

6. The system of claim 5, wherein the memory further includes executable instructions that, as a result of being executed by the one or more processors, cause the second device to determine, based at least in part on the first sensor data, the activity based at least in part on a value included in the first sensor data.

7. The system of claim 6, wherein the sensor is one of:
   a Global Positioning System receiver,
   a motion sensor,
   a camera, or
   a light sensor.

8. The system of claim 7, wherein the executable instructions further cause the second device to:
   transmit the first sensor data to an activity analysis component of a retail vendor service configured to evaluate the first sensor data;
   receive, from the activity analysis component, a determination that the activity has been performed by a user of the second device; and
   utilize the determination to detect the second performance of the activity.

9. The system of claim 7, wherein:
   the user interface component is a component of a first application; and
   the first sensor data includes application data from a second application.

10. The system of claim 5, wherein the memory further includes executable instructions that, as a result of being executed by the one or more processors, cause the second device to:
    receive, from the external server, confirmation of receipt of the request; and
    update the user interface to present the confirmation.

11. The system of claim 5, wherein the memory further includes executable instructions that, as a result of being executed by the one or more processors, cause the second device to update a graphical control element displayed on the user interface to present the user interface component.

12. A non-transitory computer-readable storage medium storing thereon executable instructions that, as a result of being executed by one or more processors of a computer system, cause the computer system to:
- deceting, based at least in part on first data obtained from a set of sensors, a first performance of an action;
- cause a user interface to display a recommendation for a physical item associated with the action;
- obtain, through the user interface, configuration information for a trigger that, as a result of being detected, causes a user interface component to be displayed in the user interface as a result of performing the action, the user interface component used to obtain the physical item by at least interacting with the user interface component by at least transmitting a request to an external device;
- obtain, from the set of sensors and a set of applications of a user device, second data satisfying the trigger and indicating a second performance of the action;
- in response to detecting the trigger based at least in part on the second data, cause the user interface component to be displayed in the user interface based at least in part on the configuration information; and
- as a result of detecting a selection of the user interface component within the user interface, transmit the request that, as a result of being received by the external device, triggers a workflow for obtaining the physical item.

13. The non-transitory computer-readable storage medium of claim 12, wherein the instructions that, as a result of being executed by the one or more processors, further cause the computer system to cause the user device to update a graphical user interface of the user device to present the user interface component within the graphical user interface of the user device such that a user of the user device can use the graphical user interface to select the user interface component.

14. The non-transitory computer-readable storage medium of claim 12, wherein the instructions that, as a result of being executed by the one or more processors, further cause the computer system to:
- detect a first performance of a second activity based at least in part on additional data obtained from the user device;
- determine, based at least in part on the second activity, a recommendation for a second user interface component indicating a second item; and
- cause a graphical user interface of the user device to present the recommendation for the second user interface component.

15. The non-transitory computer-readable storage medium of claim 12, wherein the instructions that, as a result of being executed by the one or more processors, further cause the computer system to:
- transmit a request to a retail vendor service to obtain a set of recommendations for physical items, the request including the configuration information, where the recommendation is a member of the set of recommendations;
- obtain, from the retail vendor service, the set recommendations; and
- cause the set recommendations to be stored in a cache of the user device.

16. The non-transitory computer-readable storage medium of claim 15, wherein the instructions that, as a result of being executed by the one or more processors, further cause the computer system to:
- obtain, in response to detecting the trigger, the one or more recommendations from the cache;
- select a recommendation for the physical item from the one or more recommendations; and
- configure the user interface component to present the recommendation for the physical item.

17. The non-transitory computer-readable storage medium of claim 12, wherein the instructions that, as a result of being executed by the one or more processors, further cause the computer system to:
- receive, in response to completion of the workflow, a confirmation indicating an order for the physical item; and
- cause a graphical user interface of the user device to be updated to display a notification that includes the confirmation.

18. The non-transitory computer-readable storage medium of claim 12, wherein the instructions that cause the computer system to obtain the data to detect the trigger further include instructions that, as a result of being executed by the one or more processors, cause the computer system to:
- obtain sensor data from the set of sensors;
- obtain application data from the set of applications;
- transmit, to a retail vendor service, the sensor data and the application data; and
- receive from the retail vendor service, an indication of the second performance of the action corresponding to the trigger.

19. The non-transitory computer-readable storage medium of claim 12, wherein:
- the configuration information further specifies the physical item; and
- wherein includes instructions that, as a result of being executed by the one or more processors, further cause the computer system to configure the user interface component to include an iconic representation of the physical item.

20. The computer-implemented method of claim 1, wherein the sensor of the device includes at least one of:
- a Global Positioning System receiver;
- a motion sensor;
- a camera; and
- a light sensor.

* * * * *